(12) United States Patent
Kawamura

(10) Patent No.: US 9,069,155 B2
(45) Date of Patent: Jun. 30, 2015

(54) ZOOM LENS AND IMAGE PICKUP APPARATUS

(71) Applicant: FUJIFILM Corporation, Tokyo (JP)

(72) Inventor: Daiki Kawamura, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 140 days.

(21) Appl. No.: 13/858,430

(22) Filed: Apr. 8, 2013

(65) Prior Publication Data

US 2013/0215317 A1    Aug. 22, 2013

Related U.S. Application Data

(63) Continuation of application No. PCT/JP2011/005622, filed on Oct. 5, 2011.

(30) Foreign Application Priority Data

Oct. 8, 2010   (JP) .................................. 2010-228161

(51) Int. Cl.
  *G02B 15/16*  (2006.01)
  *G02B 13/00*  (2006.01)
  *G02B 15/173* (2006.01)

(52) U.S. Cl.
  CPC .............. *G02B 13/009* (2013.01); *G02B 15/16* (2013.01); *G02B 15/173* (2013.01)

(58) Field of Classification Search
  CPC ........ G02B 15/14; G02B 15/16; G02B 15/20; G02B 15/167; G02B 13/009
  USPC .......................................... 359/676, 686–688
  See application file for complete search history.

(56) References Cited

U.S. PATENT DOCUMENTS

| 8,320,053 B2 * | 11/2012 | Misaka .......................... 359/690 |
| 2007/0146898 A1 | 6/2007 | Tomioka |
| 2008/0247054 A1 | 10/2008 | Tomioka |
| 2009/0201591 A1 | 8/2009 | Yamasaki |

(Continued)

FOREIGN PATENT DOCUMENTS

| JP | 2002-169087 | 6/2002 |
| JP | 2003-098434 | 4/2003 |

(Continued)

OTHER PUBLICATIONS

Chinese Office Action, dated Oct. 30, 2014, in corresponding Chinese Patent Application No. 201180048696.X.

(Continued)

*Primary Examiner* — Darryl J Collins
(74) *Attorney, Agent, or Firm* — Young & Thompson

(57) ABSTRACT

Disposing from an object side in the order of a positive first lens group which is fixed at the time of zooming, a negative second lens group which is moved at the time of zooming, an aperture stop, a positive third lens group which is fixed at the time of zooming, and a fourth lens group which is moved along the optical axis at the time of zooming to correct a change in image plane position arising from the zooming for focusing. The zoom lens is configured to simultaneously satisfy, when a focal length of the overall lens system at the telephoto end, an overall optical length, and an Abbe number of the second group first lens with respect to d-line are taken as ft, TL, and vd21 respectively, conditional expressions (1): 0.62<TL/ft<0.88 and (2): 30<vd21<48.

19 Claims, 23 Drawing Sheets

(56) References Cited

U.S. PATENT DOCUMENTS

| | | |
|---|---|---|
| 2010/0302651 A1 | 12/2010 | Misaka |
| 2011/0157720 A1 | 6/2011 | Katsuragi |
| 2013/0141798 A1* | 6/2013 | Hagiwara .................... 359/687 |
| 2013/0222921 A1* | 8/2013 | Wei .............................. 359/683 |

FOREIGN PATENT DOCUMENTS

| | | |
|---|---|---|
| JP | 2007-148340 | 6/2007 |
| JP | 2008-158418 | 7/2008 |
| JP | 2008-164725 | 7/2008 |
| JP | 2009-192598 | 8/2009 |
| JP | 2010-277082 | 12/2010 |
| JP | 2011-137875 | 7/2011 |
| KR | 2010-0055950 | 5/2010 |

OTHER PUBLICATIONS

Japanese Office Action, dated Jan. 20, 2015, in corresponding Japanese Patent Application No. 2012-537593, with partial English translation.

* cited by examiner

FIG.10 EXAMPLE 9

FIG.11 EXAMPLE 10

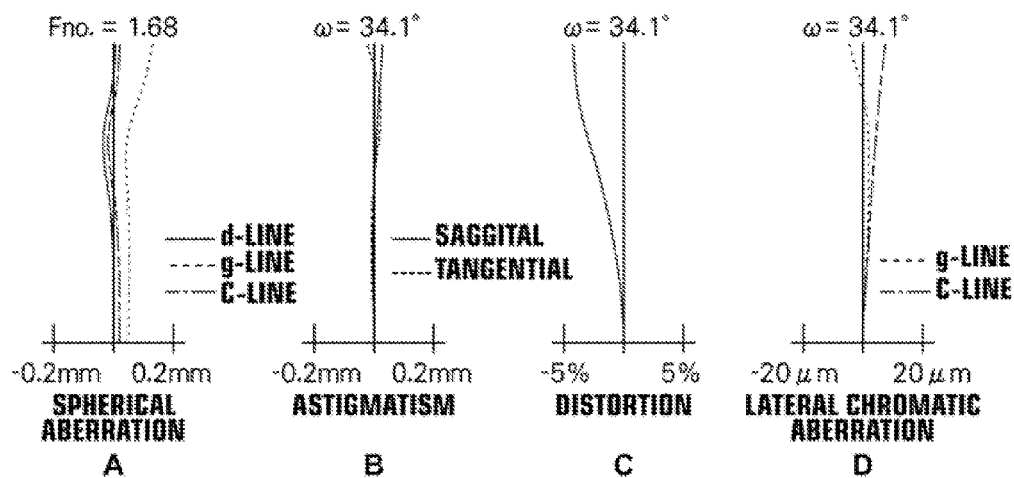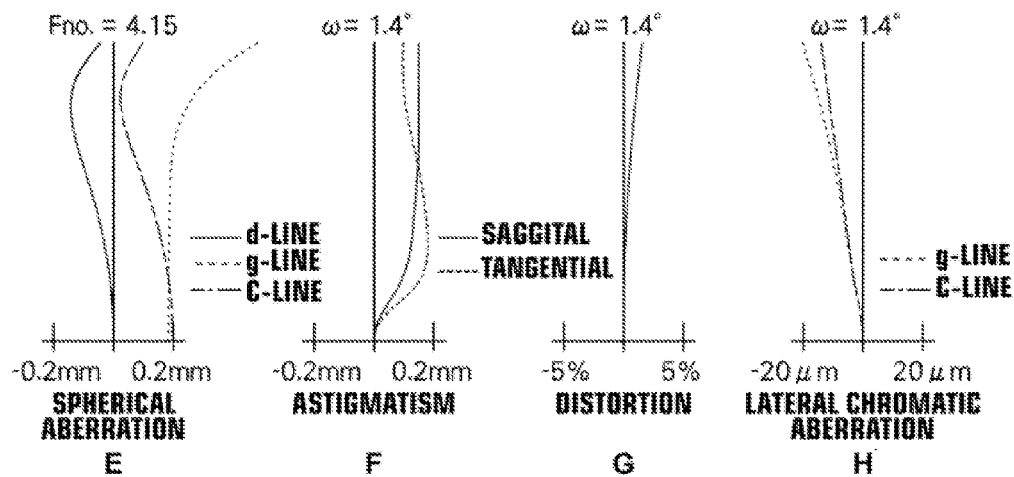
FIG.13

FIG.14
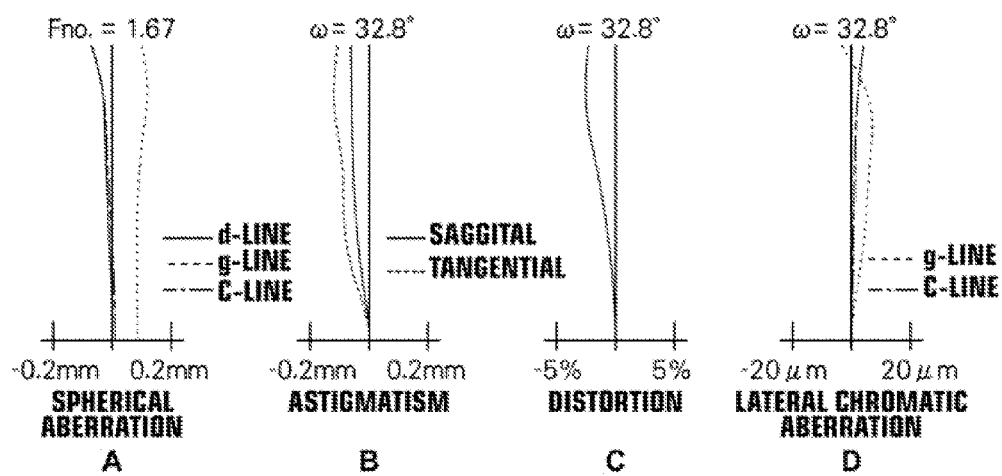
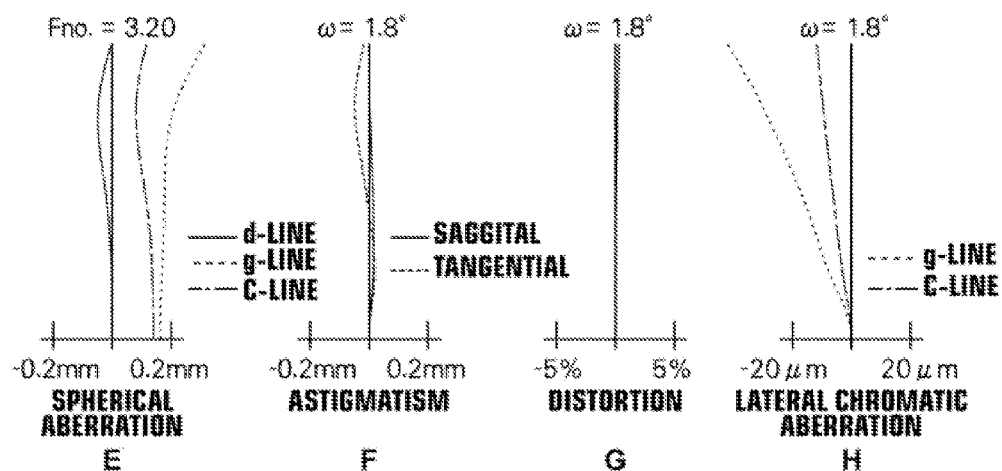

FIG.15
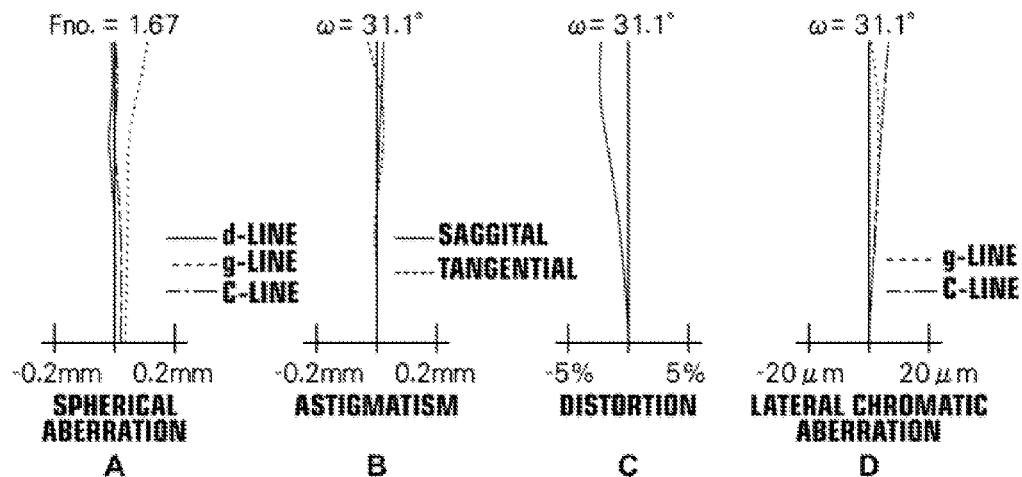
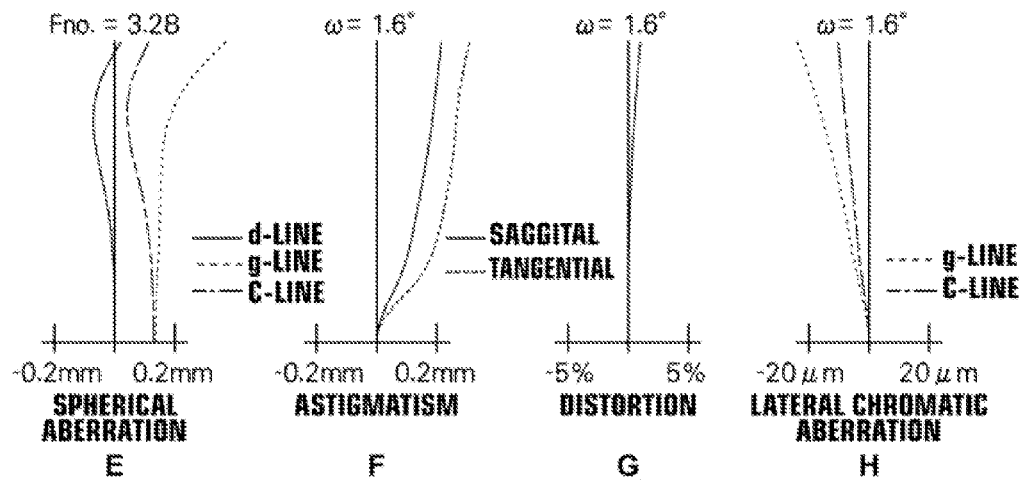

FIG.16
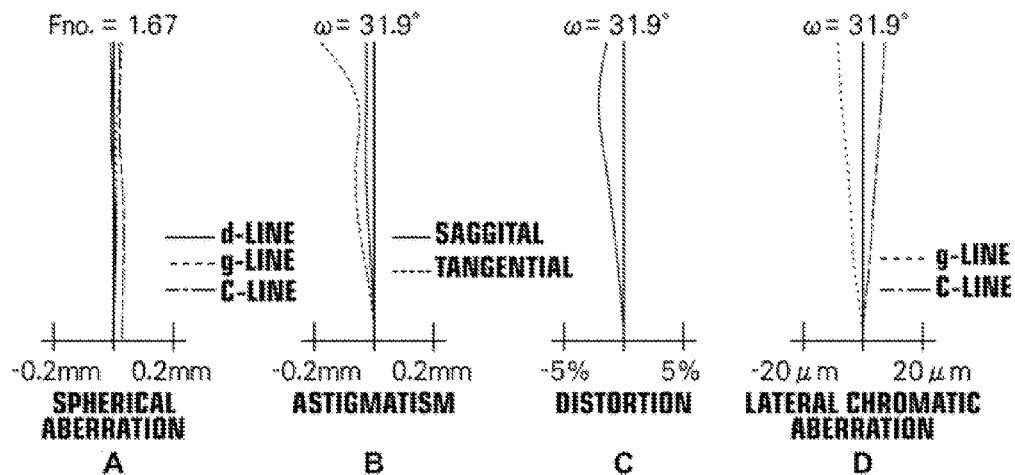
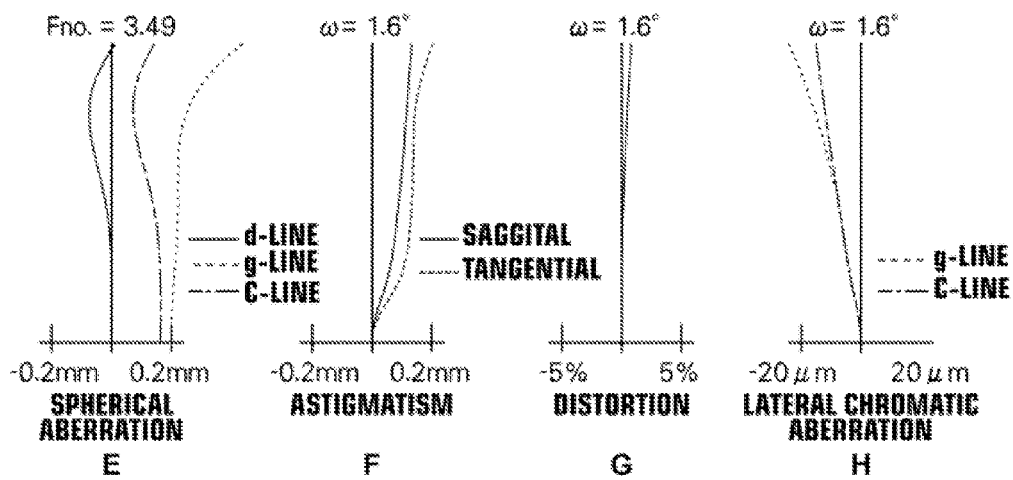

FIG.17
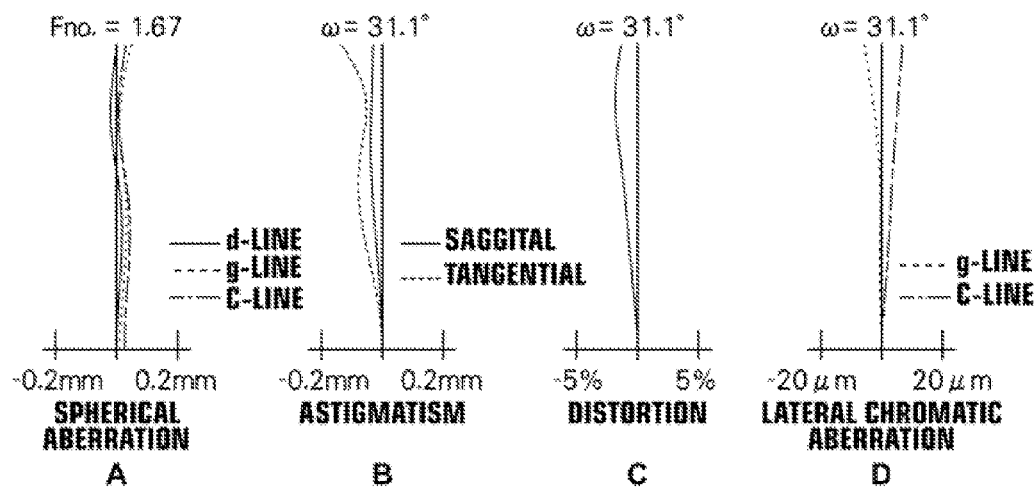
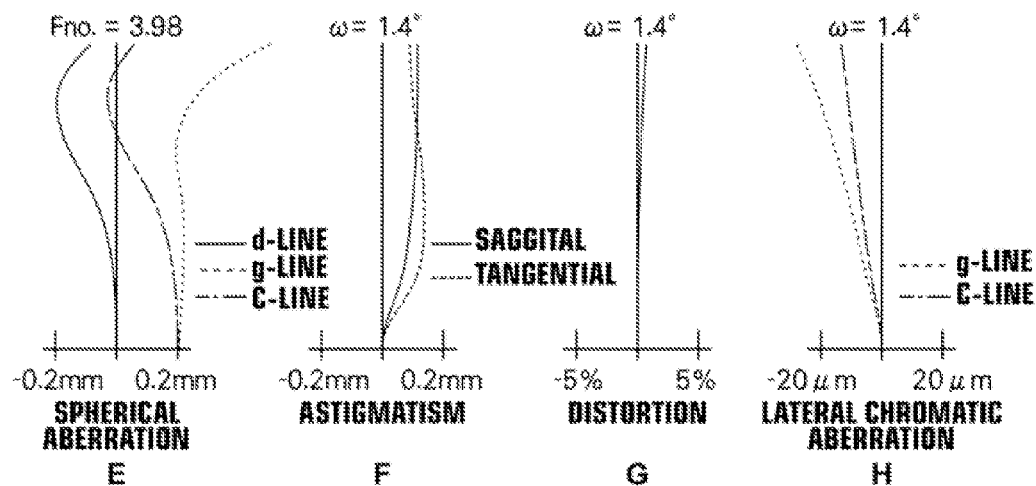

FIG.18
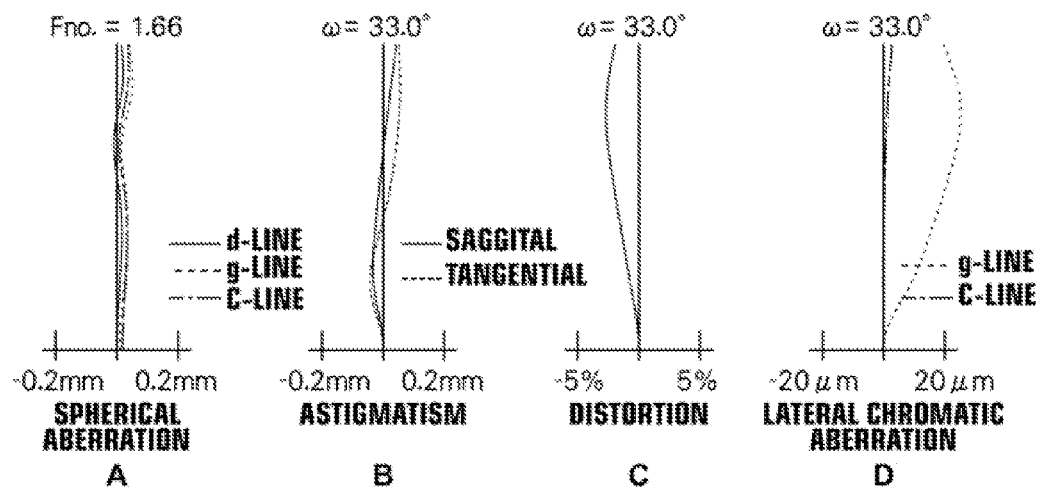
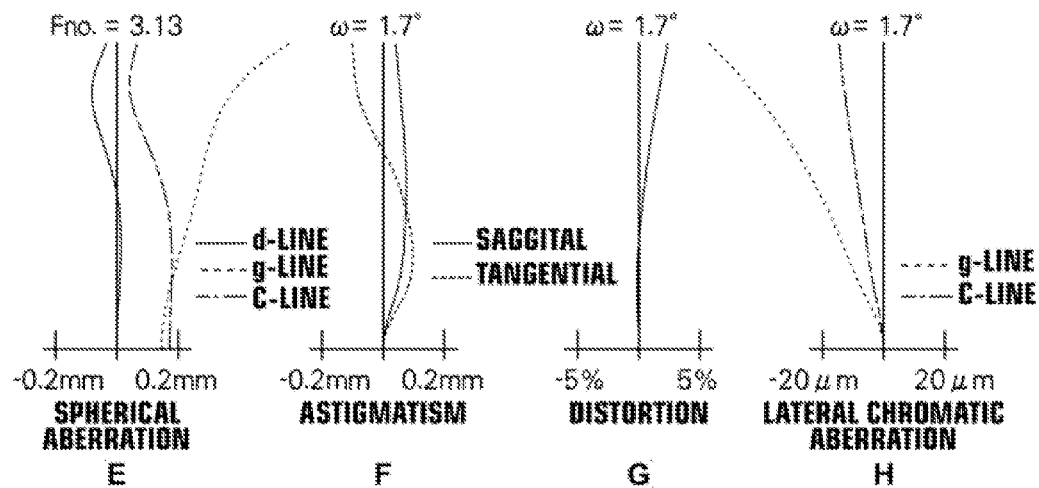

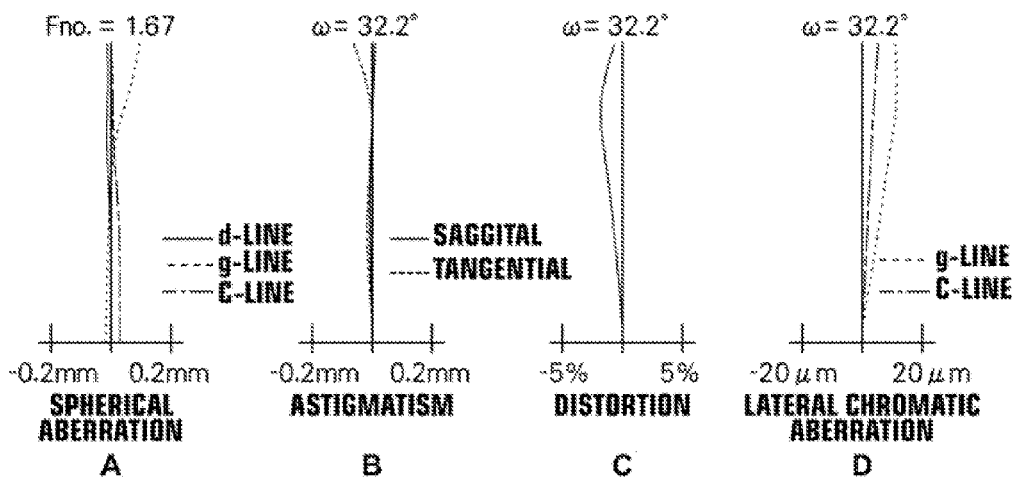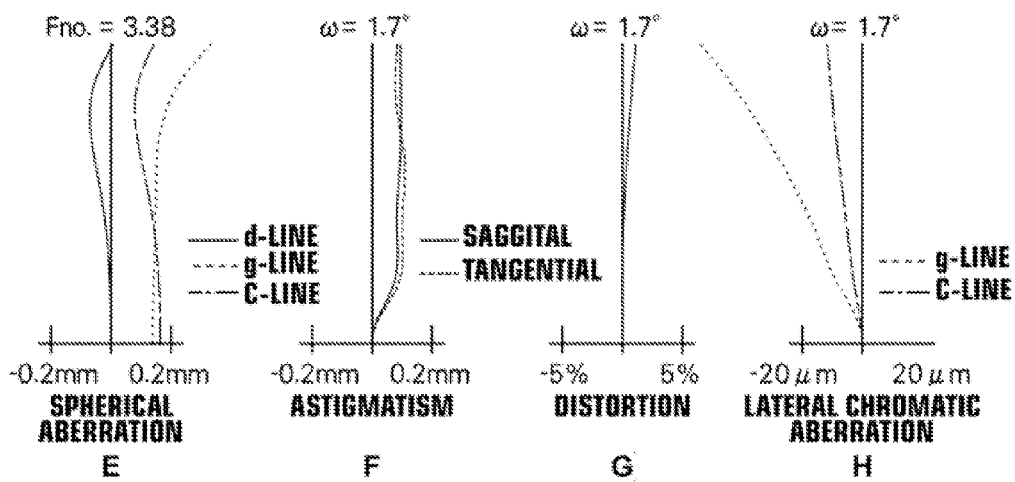

FIG.20
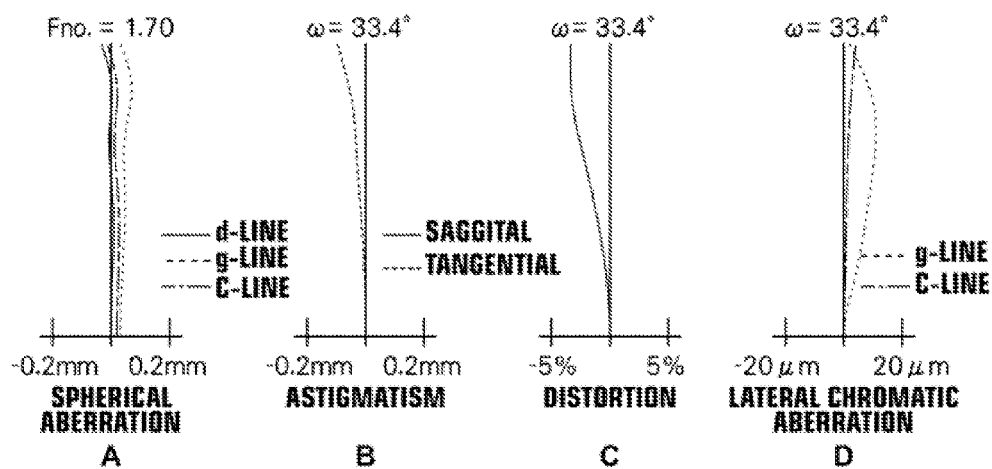
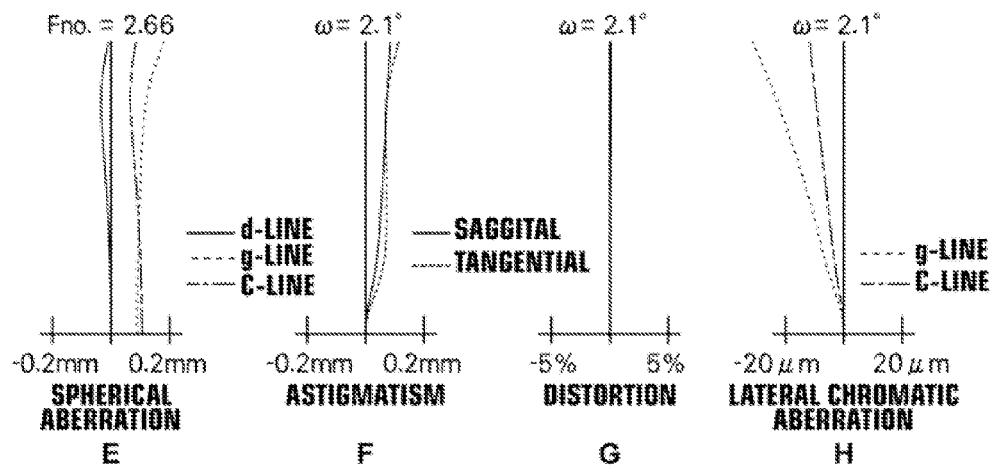

FIG.21
EXAMPLE 9
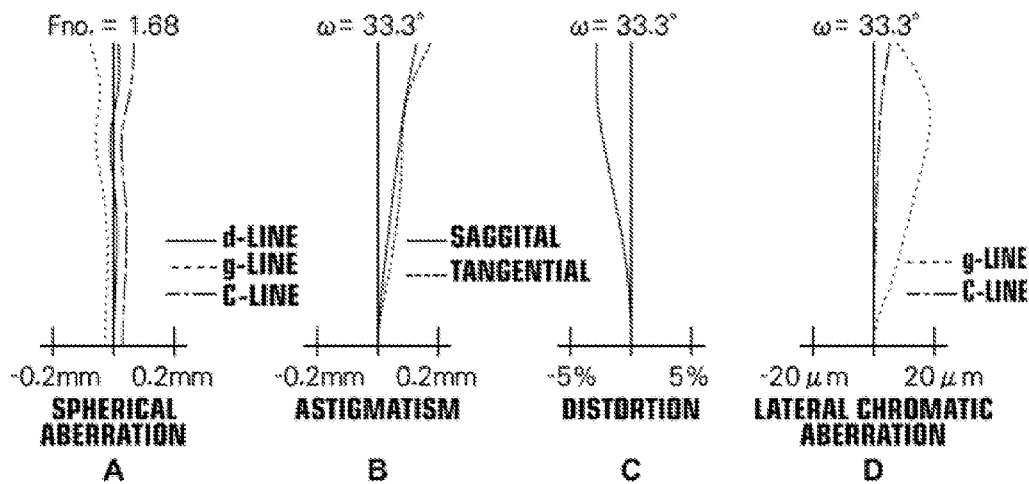
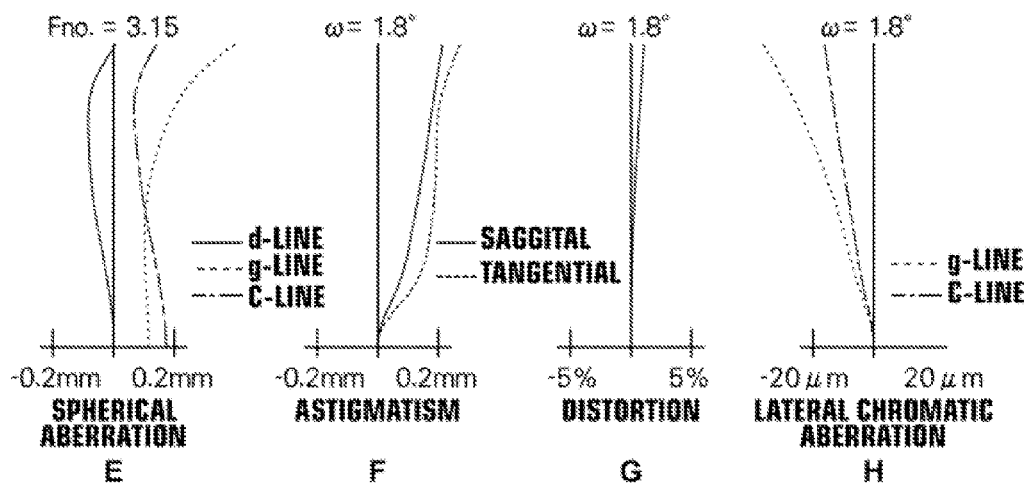

FIG.22
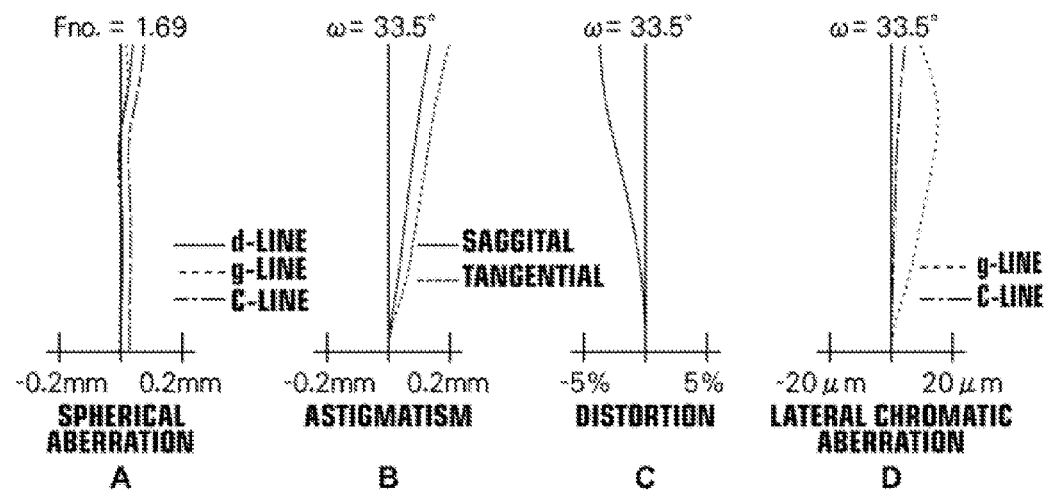
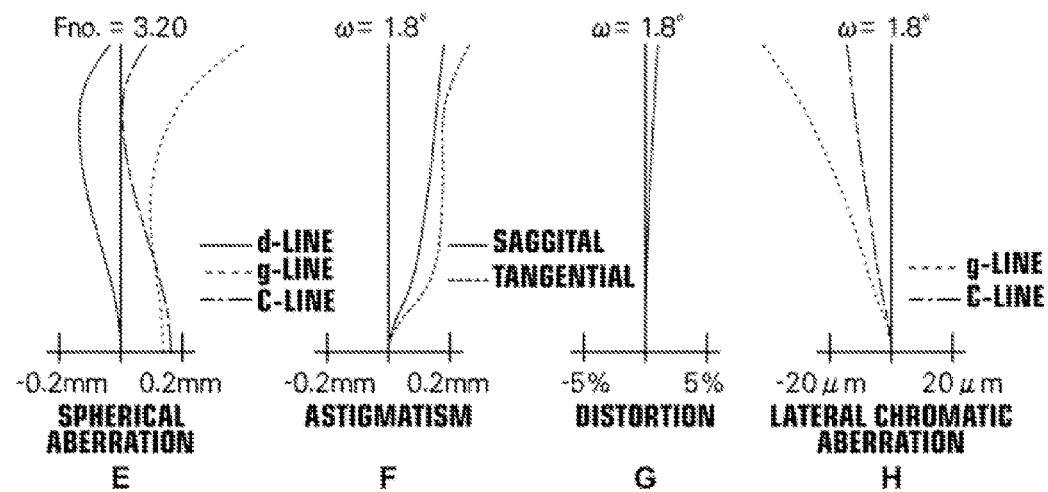

FIG.23
EXAMPLE 11
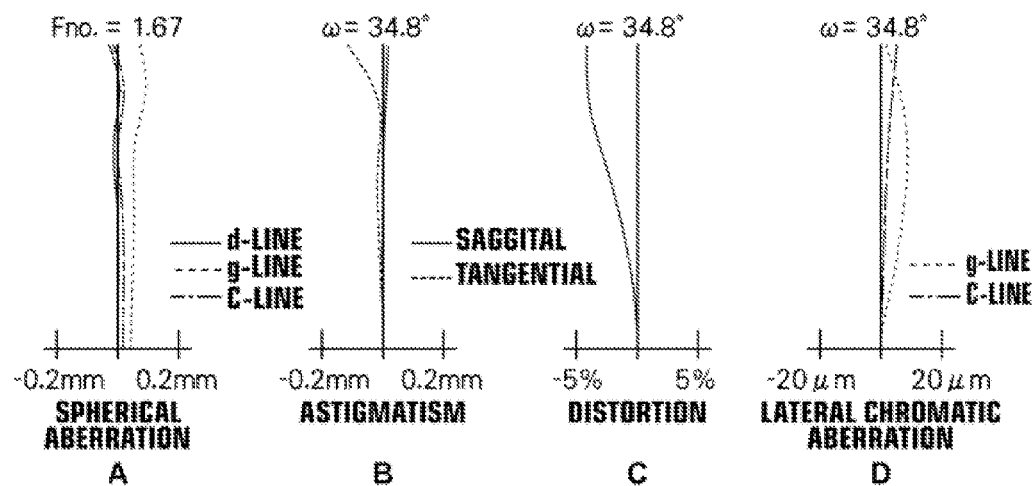
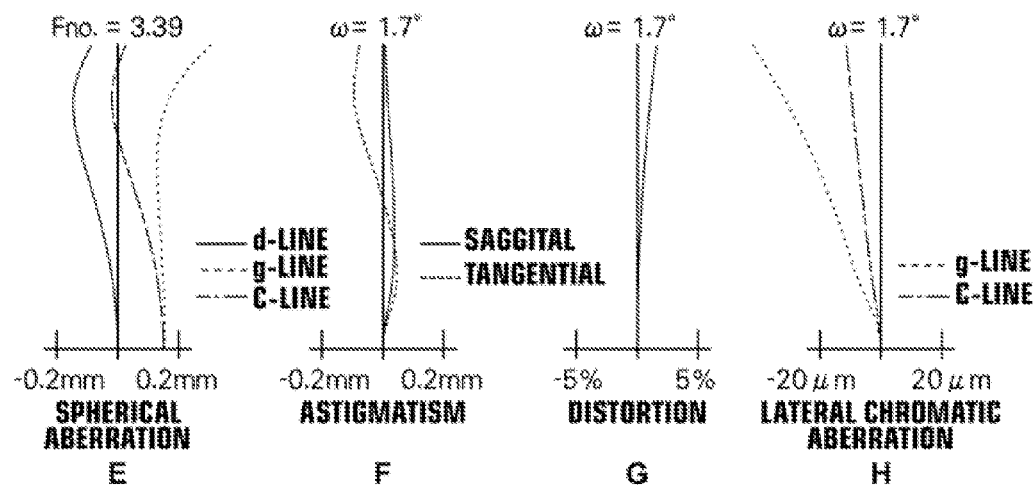

ZOOM LENS AND IMAGE PICKUP APPARATUS

TECHNICAL FIELD

The present invention relates to a zoom lens having four lens groups and an image pickup apparatus equipped with the zoom lens.

BACKGROUND ART

Heretofore, zoom lenses having four lens groups are widely known as general zoom lenses installed on image pickup devices, such as consumer video cameras, surveillance cameras, and the like. The zoom lens includes a first lens group having a positive power, a second lens group having a negative power, a third lens group having a positive power, and a fourth lens group having a positive power arranged in this order from the object side and, when zooming, while the second lens group is moved in a optical axis direction, the fourth lens group is moved to correct a change in image plane position arising from the zooming for focusing. Further, a zoom lens of five lens groups in which a fifth lens group is added as a fixed lens group is also known.

For example, as a zoom lens having a high zoom ratio, a very compact zoom lens is known as described, for example, in Japanese Unexamined Patent Publication Nos. 2007-148340 and 2009-192598.

The zoom lens described in Japanese Unexamined Patent Publication No. 2007-148340 (hereinafter, also referred to as the "zoom lens of conventional example 1") has a zoom ratio of as high as about 34 times, yet constructed very compact. In the zoom lens of conventional example 1, the second lens group is composed of three negative lenses arranged from the object side and a material having a refractive index greater than 2.0 is disposed to one of the negative lenses to increase the power of the second group. This allows the front lens diameter to be reduced and the amount of movement of the second group to be minimized at the time of zooming, whereby downsizing is achieved.

The zoom lens described in Japanese Unexamined Patent Publication No. 2009-192598 (hereinafter, also referred to as the "zoom lens of conventional example 2") is also constructed very compact with less number of lenses even though it has a high zoom ratio of about 39 times. The zoom lens of conventional example 2 is downsized by disposing a material having a refractive index of greater than 2.0 to the lens closest to the object side in the second lens group.

Further, for example, zoom lenses having large magnification ratios of, for example, about 19 times yet compact are known as described, for example, in Japanese Unexamined Patent Publication Nos. 2008-158418 and 2008-164725. Hereinafter, the zoom lens described in Japanese Unexamined Patent Publication No. 2008-158418 is also referred to as the "zoom lens of conventional example 3", and the zoom lens described in Japanese Unexamined Patent Publication No. 2008-164725 is also referred to as the "zoom lens of conventional example 4".

In each of the zoom lenses of conventional examples 3 and 4 which are of four-group configuration and five-group configuration respectively, the first lens group has a similar configuration in which a cemented lens of negative and positive lenses is disposed closest to the object side and one or two positive lenses are additionally provided.

Further, a zoom lens in which, though a zoom ratio is about 10 times, a material having an Abbe number greater than 30 is used for a negative lens in the first lens group is also known as described, for example, in Japanese Unexamined Patent Publication No. 2003-098434 (hereinafter, also referred to as the "zoom lens of conventional example 5).

DISCLOSURE OF THE INVENTION

In the mean time, a strong demand exists in the image pickup devices equipped with such zoom lenses to increase the zoom ratio while maintaining or even reducing the current size. For example, in monitoring applications and the like, there may be a case in which the image pickup device is required to conform to a specific standard size with enhanced specifications. There may also be a case in which there is no choice but to sacrifice somewhat optical performance when a specification, such as the zoom ratio, is enhanced. In such a case, it is important to assess and determine optical properties which should be prioritized and those allowed to be degraded to a certain extent, and to combine each component such that appropriate performance may be obtained.

The zoom lenses of conventional examples 1 and 2 are typical examples that have achieved high zoom ratios while their sizes are strictly restricted. They can also be viewed, however, as the designs specialized somewhat in downsizing or increased zoom ratio. If consideration is given to change the balance between the performance and size somewhat in favor of the performance than that of the zoom lenses of conventional examples 1 and 2, there may be room to contrive the configuration of the second lens group.

For example, a zoom lens utilizing a high refractive index material is advantageous for downsizing but disadvantageous from the viewpoint of correction of lateral chromatic aberration because such material causes high dispersion. The configuration in which three negative lenses are disposed on the object side of the second group, as in the zoom lens of conventional example 2, is advantageous for downsizing but the amount of aberration is increased.

Consequently, it is required to configure a zoom lens such that the amount of movement of the second lens group does not become too large at the time of zooming while selecting a material having dispersion as low as possible even if its refractive index is smaller than that of the high refractive index material described above.

In the zoom lens of conventional example 2, the second lens group is composed of a negative lens, a negative lens, and a positive lens arranged in this order from the object side and a high refractive index material is used in the negative lens closest to the object side. If it is possible to configure a second lens group using, as the high refractive index material, a material comparable to that commonly used heretofore having a refractive index of 1.8 to 1.9 with an Abbe number of 40 to 45, more specifically, S-LAH 58 or S-LAH55 (available from OHARA) or a material having a slightly larger dispersion with an Abbe number of about 30, TAFD 25 (available from HOYA) yet with a reasonable amount of movement at the time of zooming, it can be said that the performance and size are balanced somewhat in favor of the performance.

In the zoom lenses of conventional examples 1 and 2, if the lens material having a refractive index greater than 2.0 is replaced with the material having an Abbe number of 30 to 45, the amount of movement of the lens group becomes large at the time of zooming. Further, trying to increase the power in order to reduce the amount of movement will result in increased amount of aberration.

Consequently, for example, it is conceivable to dispose an aspheric lens on the image plane side. This allows the increase in the amount of aberration arising from giving a strong power to the negative lens disposed on the object side in the second lens group to be minimized, whereby the optical performance may be enhanced while the amount of movement of the second lens group is minimized at the time of zooming. The increase in the number of lenses, however, will result in the increase in the thickness of the second lens in an optical direction and it is required to compose the second lens group with a lens having a thickness as thin as possible.

Further, the zoom lens of conventional example 2 has achieved downsizing and low cost by composing a less number of lenses, more specifically, by composing the third lens group with one positive lens.

In the zoom lens of conventional example 2 in which the third lens group is composed of one positive lens, the configuration and power distribution of the third lens group or fourth lens group disposed on the image plane side of the aperture for the purpose of downsizing become very important.

A weak power of the third lens group of the zoom lens of conventional example 2 is advantageous for aberration correction but disadvantageous for downsizing due to increased overall length of the zoom lens. An excessive power in the fourth lens group for avoiding this will result in an increased variation in aberration at the time of zooming. Further, this will also result in an increased incident height of light beams incident on the fourth lens group and an increased size of the overall lens system. In this way, the downsizing of the zoom lens is conceivable by optimizing the power and configuration of the third lens group.

A zoom ratio greater than 15 or 20 times, as in the zoom lenses of conventional examples 3 and 4, causes the correction of axial chromatic aberration in the zoom range near the telephoto end to be problematic. Further, in many zoom lenses having a zoom ratio not less than 30 times, including the zoom lenses of convention examples 1 and 2, a material having an Abbe number of about 18 to 26 is used for the negative lens in the first lens group, but the chromatic aberration of short wavelength becomes more significant as the zoom ratio increases.

In order to reduce the chromatic aberration of short wave, it is effective to use a material having an Abbe number as high as possible for the negative lens in the first lens group. Although, chromatic aberration of short wavelength is corrected using a material having an Abbe number of about 31 in the zoom lenses of conventional examples 3 and 4, a compact zoom lens with a high zoom ratio capable of forming a higher quality optical image is demanded.

The use of a lens material having an Abbe number greater than 30, as in the zoom lens of conventional example 5, will result in increase in the curvature of both the negative and positive lenses constituting the cemented lens in the first lens group and increase in the size of the lens. Therefore, it is necessary to consider the balance between the required performance and size. If the chromatic aberration on the short wavelength side is somewhat larger, it can be made less noticeable by a method in which the light intensity on the short wavelength side is reduced with the combined use of a UV cut filter. Therefore, a material having small dispersion is not always used when the zoom ratio is high. Based on these, a compact zoom lens with a high zoom ratio, yet capable of forming a high quality optical image is demanded.

The present invention has been developed in view of the circumstances described above, and it is an object of the present invention to provide a zoom lens capable of forming a high quality optical image, yet compact with high zoom ratio and an image pickup apparatus equipped with the zoom lens.

A first zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the first lens group is composed of a first group first lens having a negative power, a first group second lens having a positive power, a first group third lens having a positive power, and a first group fourth lens having a positive power, disposed in this order from the object side;

the second lens group is composed of a second group first lens having a negative power, a second group second lens having a negative power, a second group third lens having a positive power, and a second group fourth lens having a positive or negative power with at least one surface being aspheric, disposed in this order from the object side; and when a focal length of the overall lens system at a telephoto end, a distance from an object side surface of the first group first lens to an image forming plane on the optical axis, and an Abbe number of the second group first lens with respect to d-line are taken as ft, TL, and vd21 respectively, the zoom lens is configured to simultaneously satisfy conditional expressions (1): $0.62<TL/ft<0.88$ and (2): $30<vd21<48$.

A second zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the first lens group is composed of a first group first lens having a negative power, a first group second lens having a positive power, a first group third lens having a positive power, and a first group fourth lens having a positive power, disposed in this order from the object side;

the second lens group is composed of a second group first lens having a negative power, a second group second lens having a negative power, a second group third lens having a positive power, disposed in this order from the object side;

the third lens group is composed of a third group first lens having a positive power with at least one surface being aspheric and a third group second lens having a negative power; and when a focal length of the overall lens system at a telephoto end, a distance from an object side surface of the first group first lens to an image forming plane on the optical axis, a focal length of the third lens group, and a focal length of the overall lens system at a wide angle end are taken as ft, TL, f3, and fw respectively, the zoom lens is configured to simultaneously satisfy conditional expressions (3): $0.62<TL/ft<0.88$ and (4): $4.2<f3/fw<8.0$.

A third zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the first lens group is composed of a first group first lens having a negative power, a first group second lens having a positive power, a first group third lens having a positive power, and a first group fourth lens having a positive power, disposed in this order from the object side;

the second lens group is composed of a second group first lens having a negative power, a second group second lens having a negative power, and a second group third lens having a positive power, disposed in this order from the object side; and when a focal length of the overall lens system at a telephoto end, an amount of movement of the second lens group at the time of zooming from a wide angle end to the telephoto end, an Abbe number of the first group first lens with respect to d-line, and an Abbe number of the second group first lens with respect to d-line are taken as ft, M2, vd11, and vd21 respectively, the zoom lens is configured to simultaneously satisfy conditional expressions (5): $0.17<M2/ft<0.32$, (6): $17<vd11<27$, and (7): $30<vd21<48$.

When an Abbe number of the first group first lens with respect to d-line is taken as vd11, the first and second zoom lenses described above are preferable to satisfy a conditional expression (8): $17<vd11<27$.

When an Abbe number of the second group first lens with respect to d-line is taken as vd21, the first and second zoom lenses described above are preferable to satisfy a conditional expression (9): $30<vd21<48$.

When an amount of movement of the second lens group at the time of zooming from the wide angle end to the telephoto end is taken as M2, the first and second zoom lenses described above are preferable to satisfy a conditional expression (10): $0.17<M2/ft<0.32$.

When a focal length of the overall lens system at the wide angle end and a focal length of the third lens group are taken as fw and f3 respectively, the zoom lenses described above are preferable to satisfy a conditional expression (11): $4.2<f3/fw<8.0$.

When a distance from an object side surface of the first group first lens to an image forming plane on the optical axis is taken as TL, the zoom lenses described above are preferable to satisfy a conditional expression (12): $0.62<TL/ft<0.88$.

Preferably, the third lens group described above is composed of a third group first lens having a positive power with at least one surface being aspheric and a third group second lens having a negative power.

Preferably, the second lens group described above includes a second group fourth lens with at least one surface being aspheric disposed on the image plane side of the second group third lens.

Preferably, in the case where the second lens group includes the second group fourth lens with at least one surface being aspheric disposed on the image plane side of the second group third lens, an object side surface is aspheric and an intersection between a vertical line drawn to the optical axis from an outermost edge of an effective area of the aspheric surface and the optical axis locates on the image plane side of an intersection between the aspheric surface and optical axis.

In the case where the second lens group includes the second group fourth lens with at least one surface being aspheric disposed on the image plane side of the second group third lens, the second group fourth lens may be a plastic lens.

In the case where the second lens group includes the second group fourth lens with at least one surface being aspheric disposed on the image plane side of the second group third lens, the second group fourth lens is preferable to satisfy, when a focal length of the second group fourth lens and a focal length of the second lens group are taken as f24 and f2 respectively, a conditional expression (13): $10.0<|f24/f2|$.

When a refractive index of the first group fourth lens with respect to d-line and an Abbe number of the first group fourth lens with respect to d-line are taken as Nd14 and vd14 respectively, the first group fourth lens is preferable to simultaneously satisfy conditional expressions (14): $1.70<Nd14$ and (15): $42<vd14<58$.

When an Abbe number of at least one positive lens in the first lens group with respect to d-line is taken as vd1m, the first lens group is preferable to satisfy a conditional expression (16): $75<vd1m$.

When a focal length of the first lens group is taken as f1, the zoom lenses described above are preferable to satisfy a conditional expression (17): $0.25<f1/ft<0.50$.

Preferably, the second group second lens and second group third lens are cemented and, when a refractive index of the second group second lens is taken as Nd22, the second lens group is preferable to satisfy a conditional expression (18): $1.89<Nd22$.

When a focal length of the second lens group and a focal length of the overall lens system at the wide angle end are taken as f2 and fw respectively, the zoom lenses described above are preferable to satisfy a conditional expression (19): $0.25<|f2|/(fw \cdot ft)^{1/2}<0.38$.

When a focal length of the overall lens system at the wide angle end and a maximum image height are taken as fw and IH respectively, the zoom lenses described above are preferable to satisfy a conditional expression (20): $1.30<fw/IH<1.75$.

An image pickup apparatus of the present invention is an apparatus, including any of the zoom lenses described above.

In the case where a cemented lens is included and if the cemented lens is composed of n lenses, the n lenses are counted in the total number of lenses of the cemented lens.

In the case where a lens surface is aspheric, the concavity or convexity, positive or negative for the refractive power, radius of curvature, and the like, of the lens surface are defined in the paraxial region. The sign of a radius of curvature of a lens is positive if it is convex to the object side and negative if it is convex to the image side.

The outermost edge of an effective area of the lens surface described above refers to a position most remote from the optical axis within the effective area of the lens surface. The effective area as used herein refers to an area of a lens surface through which light beams used to form an optical image on the imaging plane through the zoom lens pass. The imaging plane as used herein refers to an area from which an optical image may be captured.

According to the first zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side. The first lens group is composed of a first group first lens having a negative power, a first group second lens having a positive power, a first group third lens having a positive power, and a first group fourth lens having a positive power, disposed in this order from the object side, and the second lens group is composed of a second group first lens having a negative power, a second group second lens having a negative power, a second group third lens having a positive power, and a second group fourth lens having a positive or negative power with at least one surface being aspheric, disposed in this order from the object side. When a focal length of the overall lens system at the telephoto end, overall optical length, and Abbe number of the second group first lens with respect to d-line are taken as ft, TL, and νd21 respectively, the zoom lens is configured to simultaneously satisfy conditional expressions (1): 0.62<TL/ft<0.88 and (2): 30<νd21<48. Therefore, the first zoom lens and image pickup apparatus may form a high quality optical image, yet compact with high zoom ratio.

Here, the conditional expression (1) specifies the relationship between the overall optical length and the focal length of the overall system at the telephoto end.

If the first zoom lens is configured to fall below the lower limit of the conditional expression (1) for downsizing, the correction of field curvature becomes difficult. Further, the power of each lens becomes too strong and becomes sensitive (sensitivity is increased) to the performance degradation due to manufacturing error or assembly error, thereby causing a problem of very high level of difficulty in manufacturing. Still further, this also causes a problem that the variation in aberration at the time of zooming or focusing becomes large.

Contrary to this, if the first zoom lens is configured to exceed the upper limit of the conditional expression (1), there arises a problem that the size of the lens system is increased, though advantageous for aberration correction.

The conditional expression (2) specifies the Abbe number of the material of the second group first lens.

If the first zoom lens is configured to fall outside the range of the conditional expression (2), there arises a problem that the correction of lateral chromatic aberration becomes difficult, in particular, the correction of lateral chromatic aberration near the wide angle end in a well-balanced manner with respect to each wavelength.

If the first zoom lens is configured to exceed the upper limit of the conditional expression (2), the refractive index is generally reduced as the value of νd21 is increased beyond the upper limit of the conditional expression (2). If trying to implement downsizing by applying such a material to the second group first lens and giving a strong power thereto, the curvature of the lens becomes large, the thickness of the overall second lens group is increased, and there arises a problem that the amount of variation in aberration becomes large.

According to the second zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side. The first lens group is composed of a first group first lens having a negative power, a first group second lens having a positive power, a first group third lens having a positive power, and a first group fourth lens having a positive power, disposed in this order from the object side, the second lens group is composed of a second group first lens having a negative power, a second group second lens having a negative power, and a second group third lens having a positive power, disposed in this order from the object side, and the third lens group is composed of a third group first lens having a positive power with at least one surface being aspheric and a third group second lens having a negative power. When a focal length of the overall lens system at a telephoto end, a distance from an object side surface of the first group first lens to an image forming plane on the optical axis, a focal length of the third lens group, and a focal length of the overall lens system at a wide angle end are taken as ft, TL, f3, and fw respectively, the zoom lens is configured to simultaneously satisfy conditional expressions (3): 0.62<TL/ft<0.88 and (4): 4.2<f3/fw<8.0. Therefore, the second zoom lens and image pickup apparatus may form a high quality optical image, yet compact with high zoom ratio.

Here, the conditional expression (3) is the same as the conditional expression (1) described above and specifies the relationship between the overall optical length and focal length of the overall system at the telephoto end, as in the conditional expression (1).

If the second zoom lens is configured to fall below the lower limit of the conditional expression (3) for downsizing, correction of field curvature becomes difficult. Further, the power of each lens becomes too strong and becomes sensitive (sensitivity is increased) to the performance degradation due to manufacturing error or assembly error, thereby causing a problem of very high level of difficulty in manufacturing. Still further, this also causes a problem of increased variation in the aberration at the time of zooming and focusing.

Contrary to this, if the second zoom lens is configured to exceed the upper limit of the conditional expression (3), there arises a problem that the size of the lens system is increased, though advantageous for aberration correction.

The conditional expression (4) specifies the relationship between the focal length of the third lens group and the focal length of the overall lens system at the wide angle end.

If the second zoom lens is configured to fall below the lower limit of the conditional expression (4), there arises a problem that the correction of the spherical aberration near the wide angle end becomes difficult.

Contrary to this, if the second zoom lens is configured to exceed the upper limit of the conditional expression (4), the power of the third lens group becomes weak which is advantageous for the aberration correction but disadvantageous for downsizing since the overall length of the lens becomes long. In order to avoid this, an excessive increase in the power of the fourth lens group causes a problem that the variation in aberration at the time of zooming becomes large. Further, the light incident height on the fourth lens group becomes large, causing a problem that the size of the overall lens system is increased.

According to the third zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side. The first lens group is composed of a first group first lens having a negative power, a first group second lens having a positive power, a first group third lens having a positive power, and a first group fourth lens having a positive power, disposed in this order from the object side, and the second lens group is composed of a second group first lens having a negative power, a second group second lens having a negative power, and a second group third lens having a positive power, disposed in this order from the object side. When a focal length of the overall lens system at a telephoto end, an amount of movement of the second lens group at the time of zooming from a wide angle end to the telephoto end, an Abbe number of the first group first lens with respect to d-line, and an Abbe number of the second group first lens with respect to d-line are taken as ft, M2, vd11, and vd21 respectively, the third zoom lens configured to simultaneously satisfy conditional expressions (5): 0.17<M2/ft<0.32, (6): 17<vd11<27, and (7): 30<vd21<48. Therefore, the third zoom lens and image pickup apparatus may form a high quality optical image, yet compact with high zoom ratio.

Here, the conditional expression (5) specifies the relationship between the amount of movement of the second lens group at the time of zooming from the wide angle end to the telephoto end and the focal length of the overall lens system at the telephoto end.

If the third zoom lens is configured to fall below the lower limit of the conditional expression (5), the power of the second lens group becomes strong and the amount of movement of the second lens group is reduced. But, there arises a problem that the correction of field curvature becomes difficult.

Contrary to this, if the third zoom lens is configured to exceed the upper limit of the conditional expression (5), there arises a problem that the overall length of the lens becomes long.

The conditional expression (6) specifies the Abbe number of the first group first lens.

If the third zoom lens is configured to fall below the lower limit of the conditional expression (6), the thickness of the lens may be reduced. But, this causes a problem that the chromatic aberration, in particular, the short wavelength axial chromatic aberration near the telephoto end becomes large.

Contrary to this, if the third zoom lens is configured to exceed the upper limit of the conditional expression (6), the curvatures of the first group first lens and first group second lens become large, and the central lens thickness is increased for ensuring a required edge thickness, thereby causing a problem of an increased size of the first lens group. Further, there arises a problem that the Petzval sum is increased in the negative direction.

The conditional expression (7) is the same as the conditional expression (2) described above and specifies the Abbe number of the material of the second group first lens, as in the conditional expression (2).

If the third zoom lens is configured to fall outside the range of the conditional expression (7), there arises a problem that the correction of lateral chromatic aberration becomes difficult, in particular, the correction of lateral chromatic aberration near the wide angle end in a well-balanced manner with respect to each wavelength.

If the third zoom lens is configured to exceed the upper limit of the conditional expression (7), the refractive index is generally reduced as the value of vd21 is increased beyond the upper limit of the conditional expression (7). If trying to implement downsizing by applying such a material to the second group first lens and giving a strong power thereto, the curvature of the lens becomes large, the thickness of the overall second lens group is increased, and there arises a problem that the amount of variation in aberration becomes large.

BRIEF DESCRIPTION OF DRAWINGS

FIG. 13 illustrates various types of aberrations of the zoom lens of Example 1.

FIG. 14 illustrates various types of aberrations of the zoom lens of Example 2.

FIG. 15 illustrates various types of aberrations of the zoom lens of Example 3.

FIG. 16 illustrates various types of aberrations of the zoom lens of Example 4.

FIG. 17 illustrates various types of aberrations of the zoom lens of Example 5.

FIG. 18 illustrates various types of aberrations of the zoom lens of Example 6.

FIG. 19 illustrates various types of aberrations of the zoom lens of Example 7.

FIG. 20 illustrates various types of aberrations of the zoom lens of Example 8.

FIG. 21 illustrates various types of aberrations of the zoom lens of Example 9.

FIG. 22 illustrates various types of aberrations of the zoom lens of Example 10.

FIG. 23 illustrates various types of aberrations of the zoom lens of Example 11.

BEST MODE FOR CARRYING OUT THE INVENTION

Figure 1:
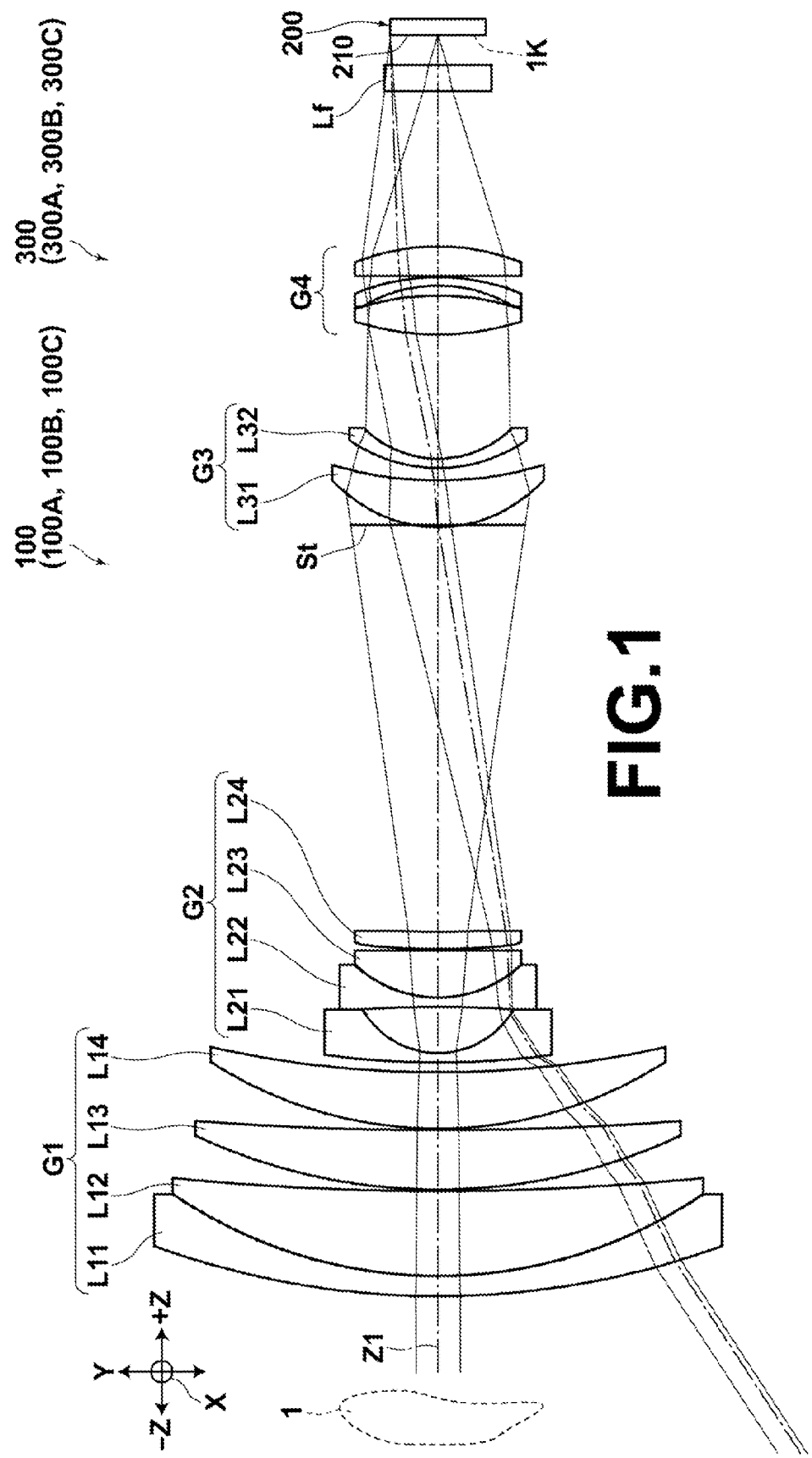
FIG. 1 is a cross-sectional view of an image pickup apparatus equipped with a zoom lens of the present invention, illustrating a schematic configuration thereof.
Figure 2:
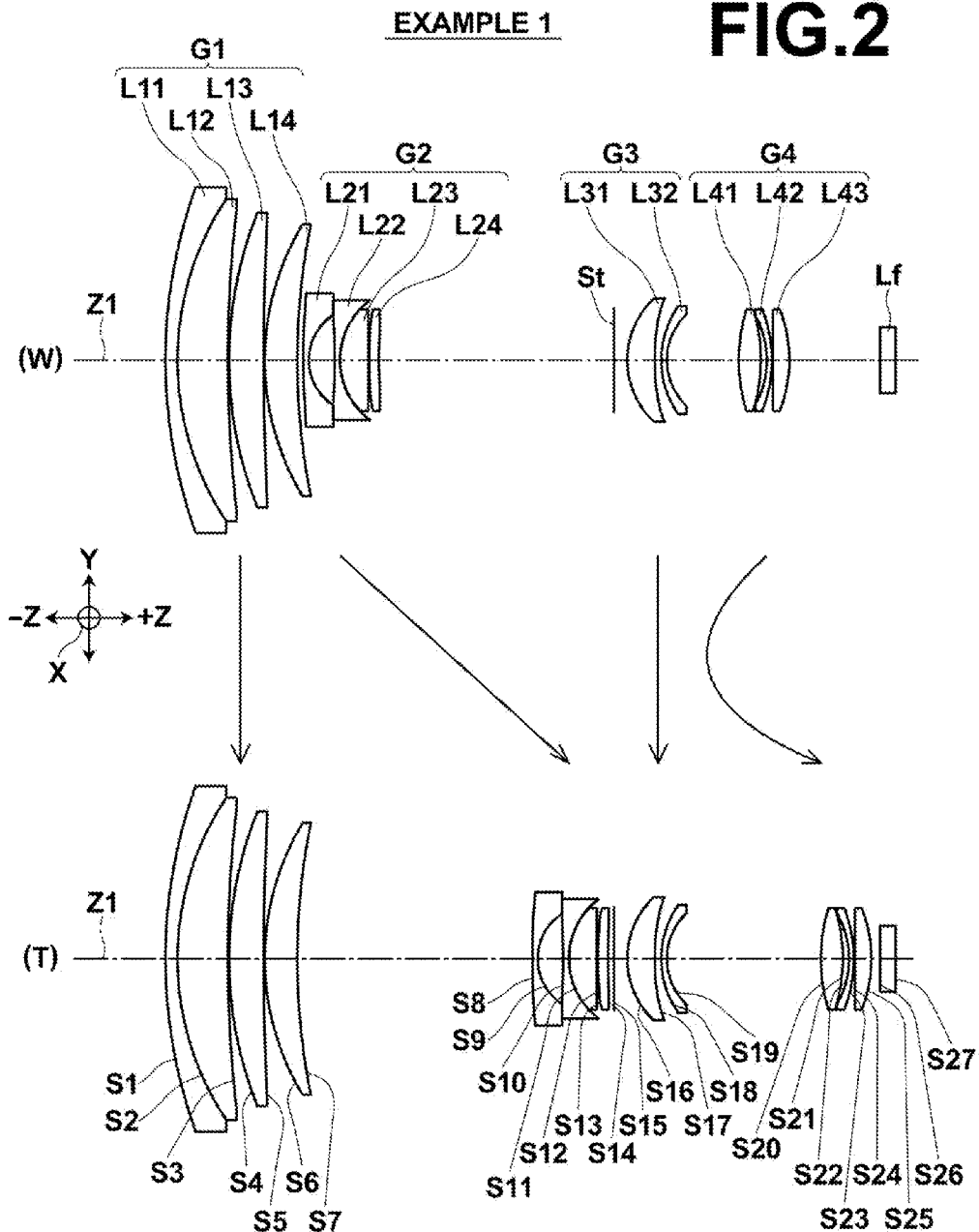
FIG. 2 is a cross-sectional view of a zoom lens of Example 1, comparatively illustrating the state in which the zoom is set to a wide angle end and the state in which it is set to a telephoto end.
Figure 3:
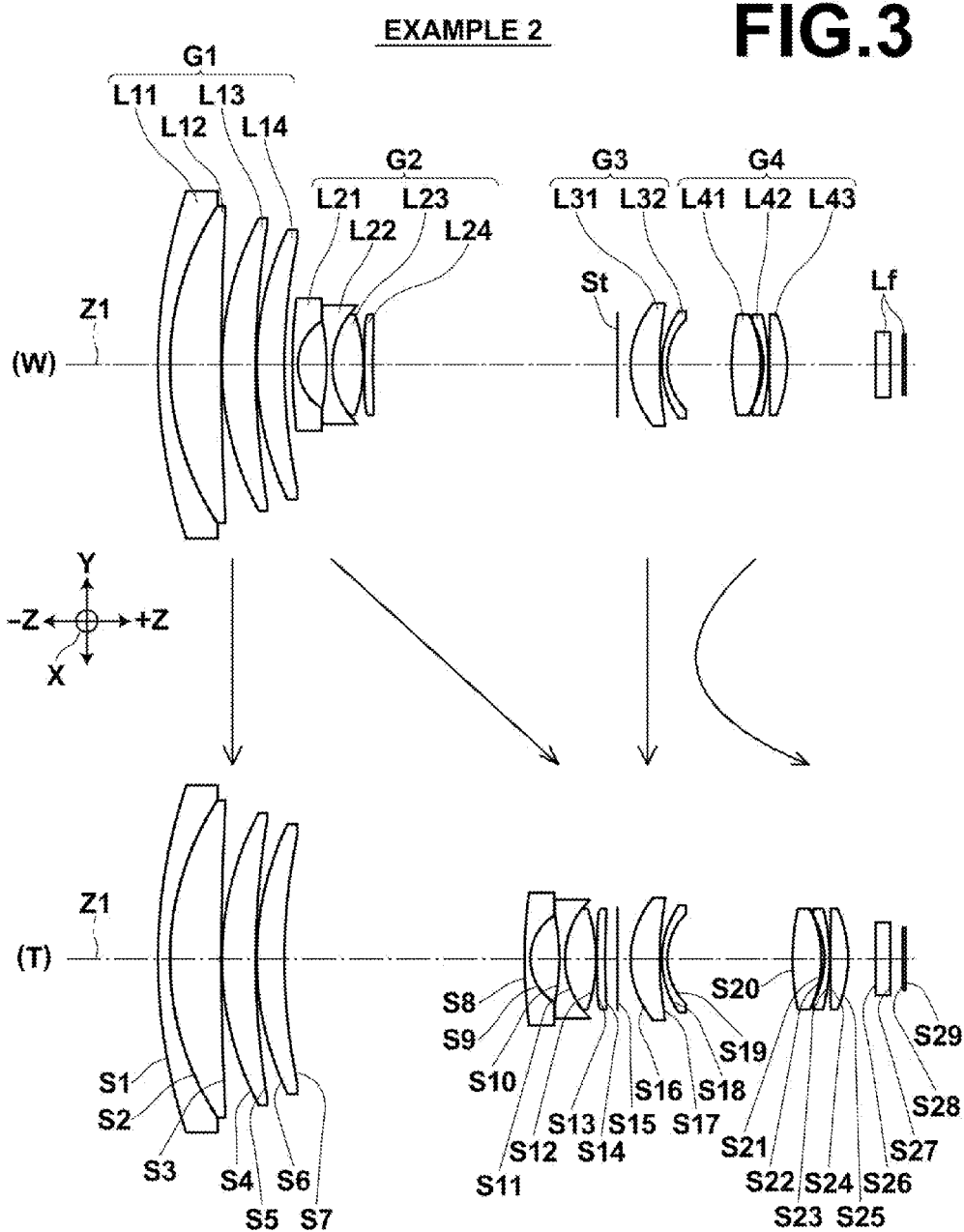
FIG. 3 is a cross-sectional view of a zoom lens of Example 2, comparatively illustrating the state in which the zoom is set to a wide angle end and the state in which it is set to a telephoto end.
Figure 4:
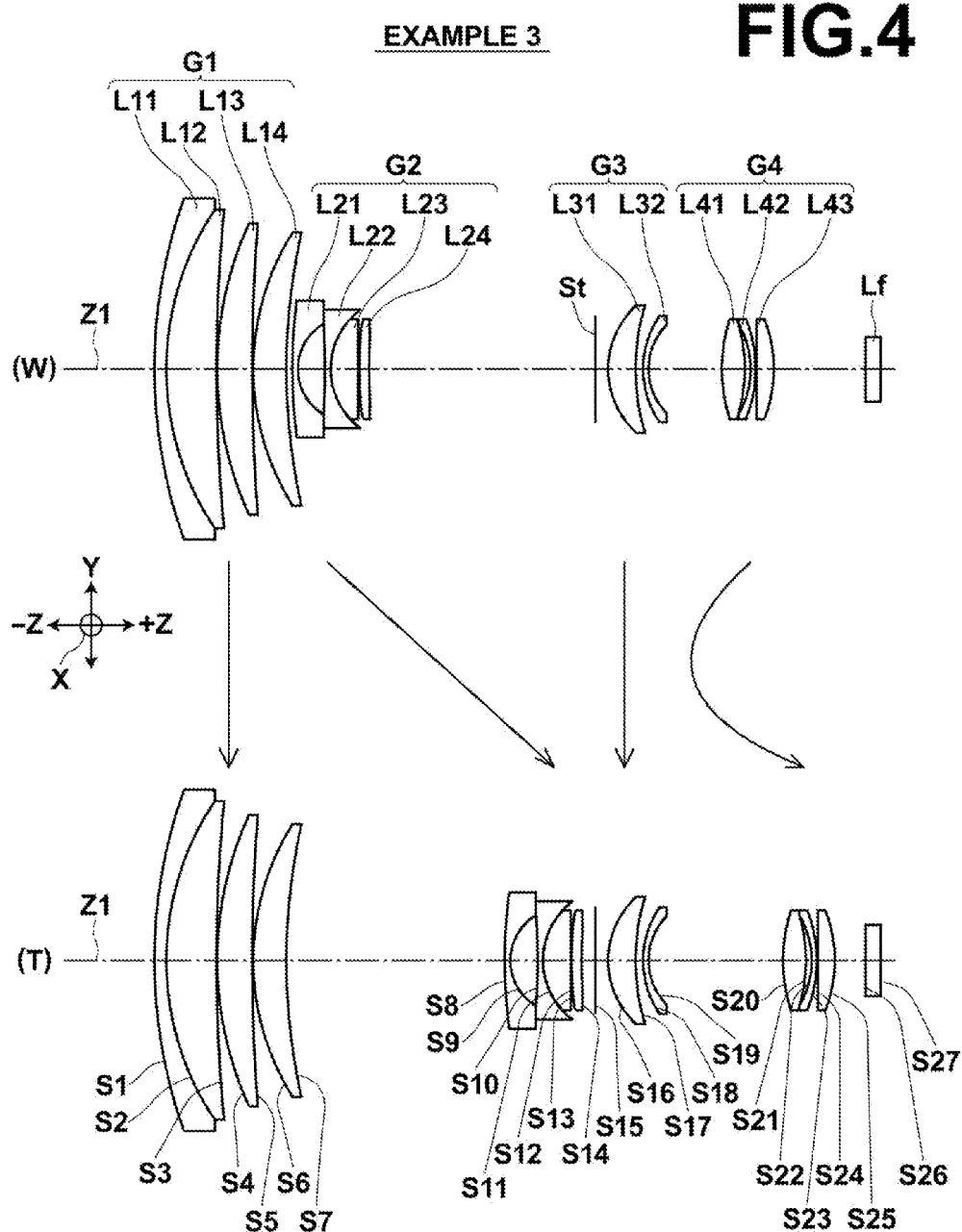
FIG. 4 is a cross-sectional view of a zoom lens of Example 3, comparatively illustrating the state in which the zoom is set to a wide angle end and the state in which it is set to a telephoto end.
Figure 5:
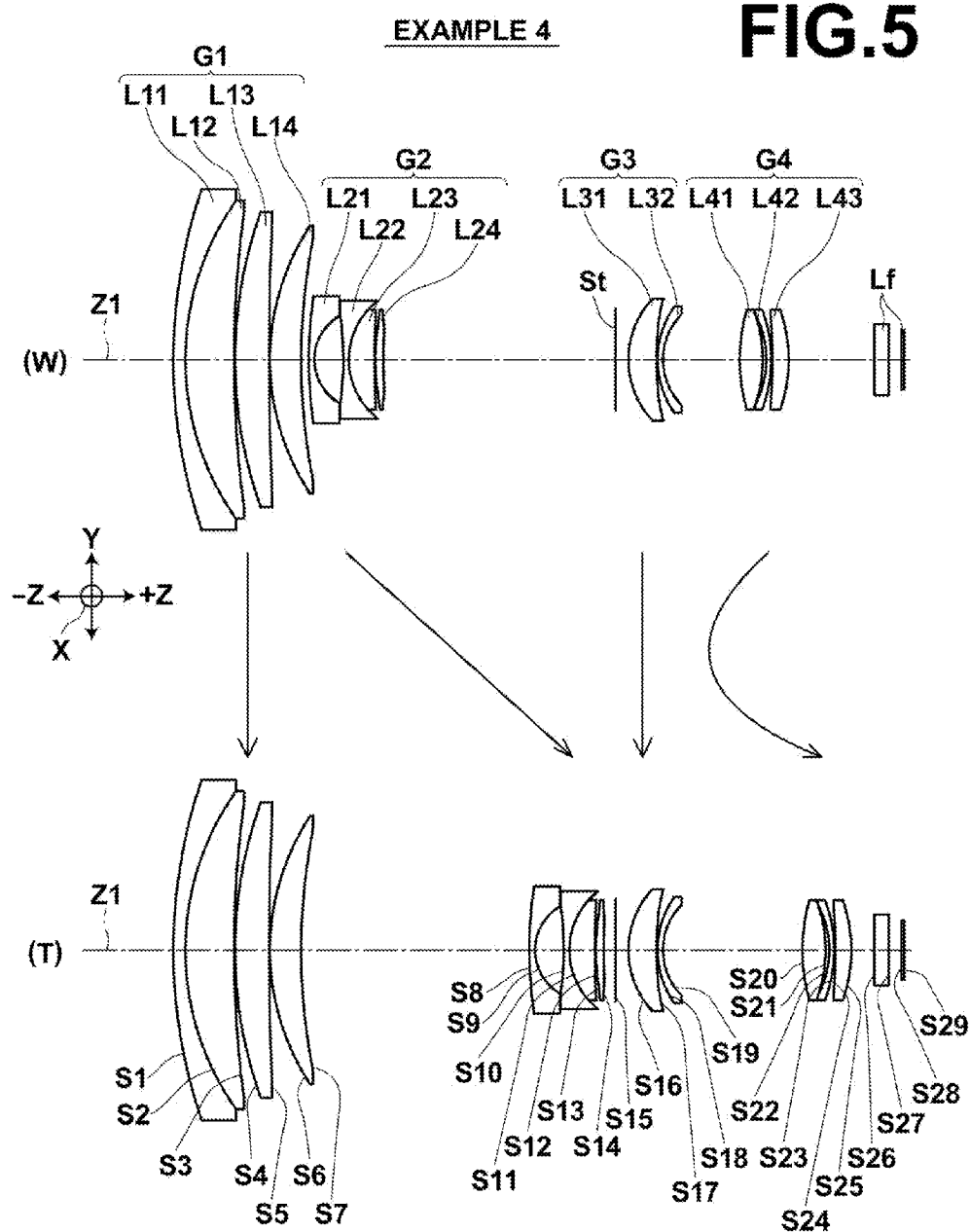
FIG. 5 is a cross-sectional view of a zoom lens of Example 4, comparatively illustrating the state in which the zoom is set to a wide angle end and the state in which it is set to a telephoto end.
Figure 6:
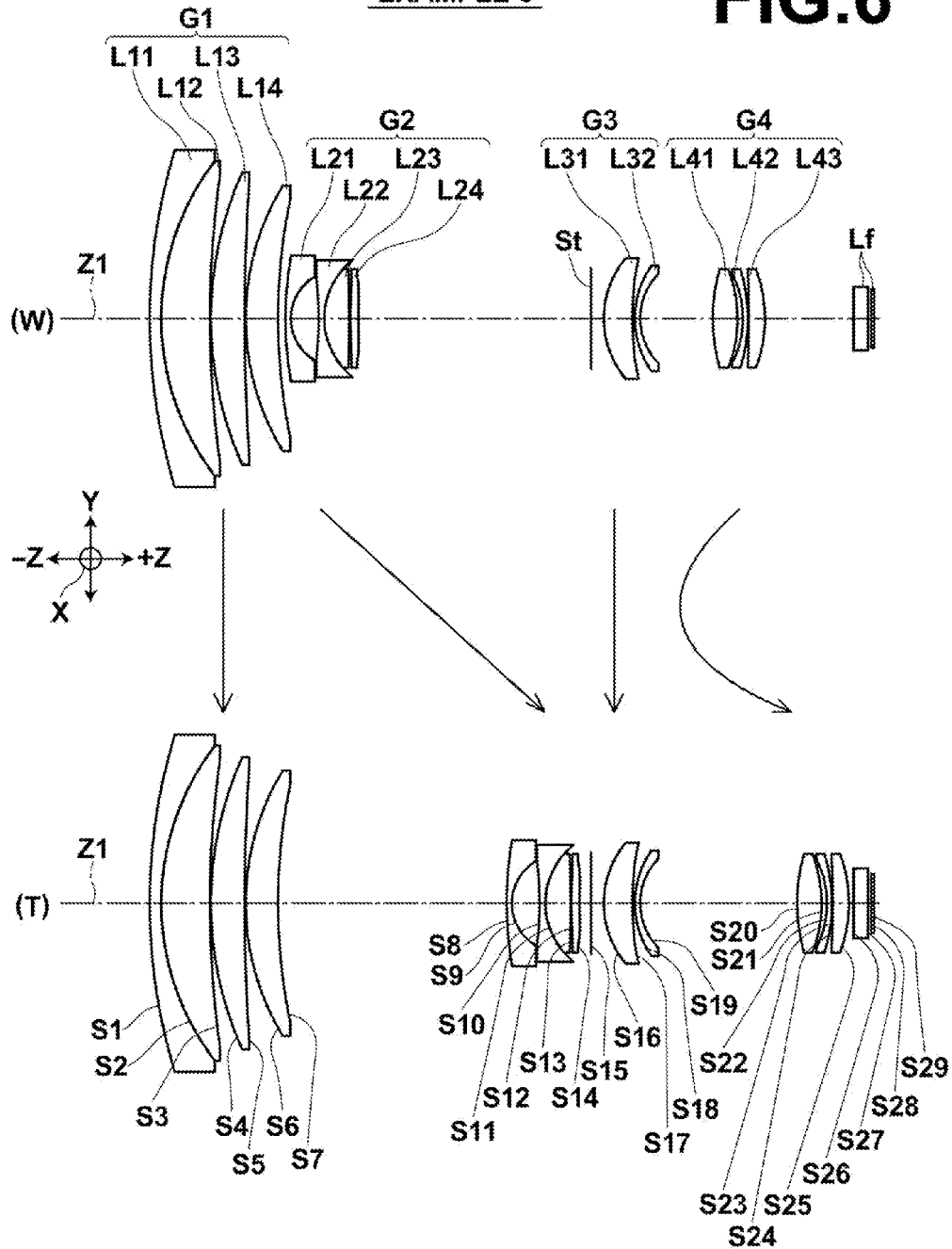
FIG. 6 is a cross-sectional view of a zoom lens of Example 5, comparatively illustrating the state in which the zoom is set to a wide angle end and the state in which it is set to a telephoto end.
Figure 7:
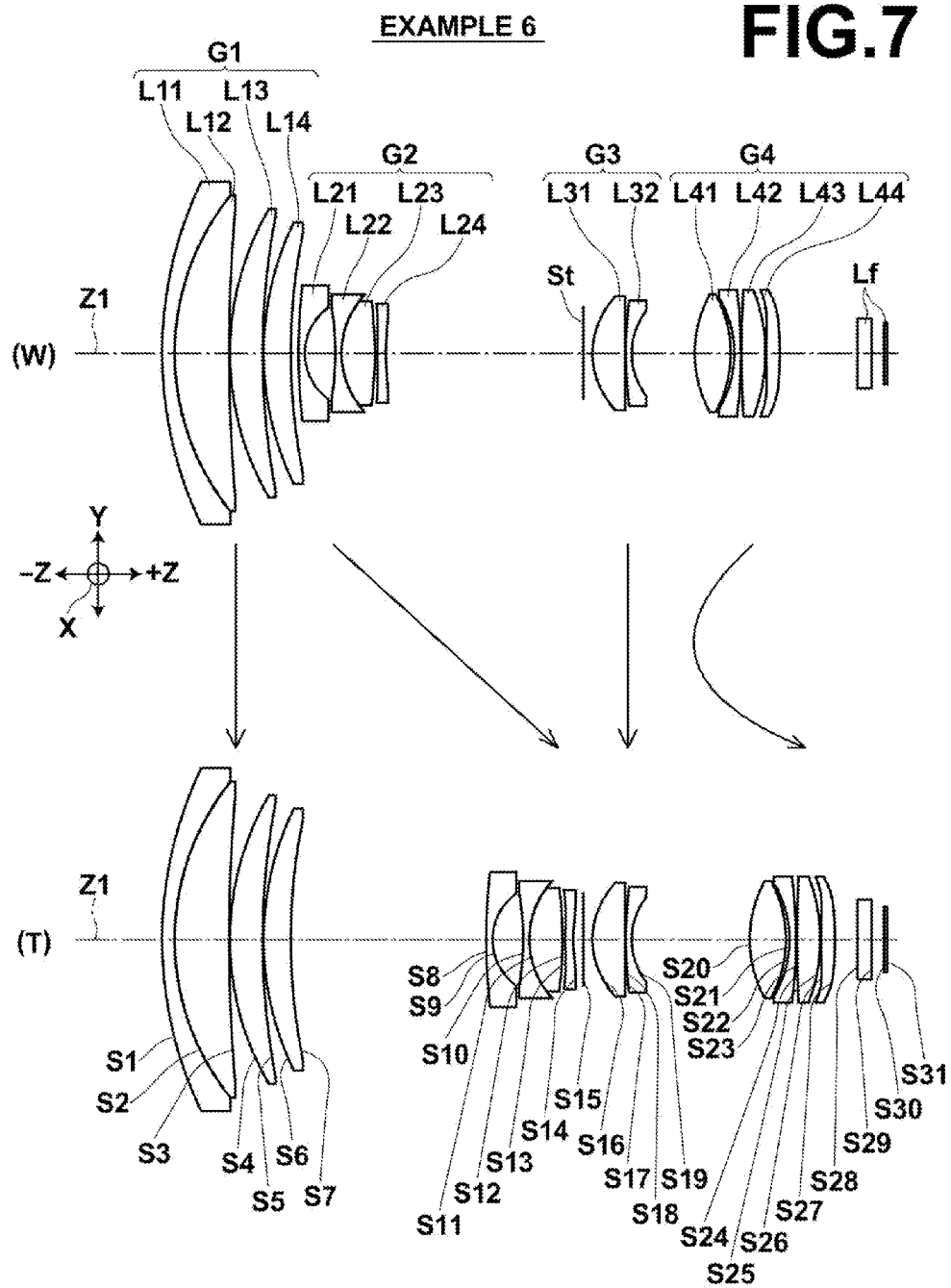
FIG. 7 is a cross-sectional view of a zoom lens of Example 6, comparatively illustrating the state in which the zoom is set to a wide angle end and the state in which it is set to a telephoto end.
Figure 8:
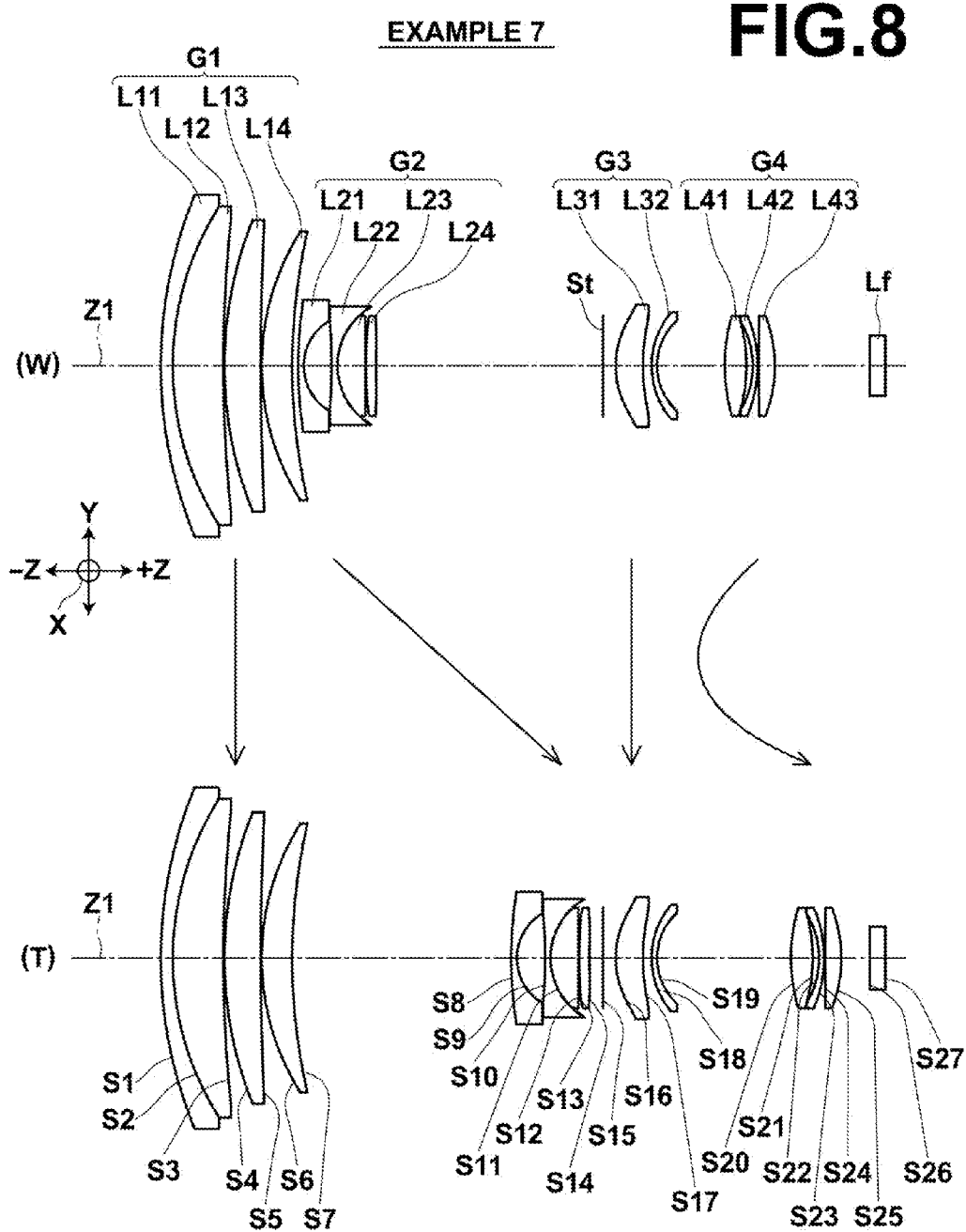
FIG. 8 is a cross-sectional view of a zoom lens of Example 7, comparatively illustrating the state in which the zoom is set to a wide angle end and the state in which it is set to a telephoto end.
Figure 9:
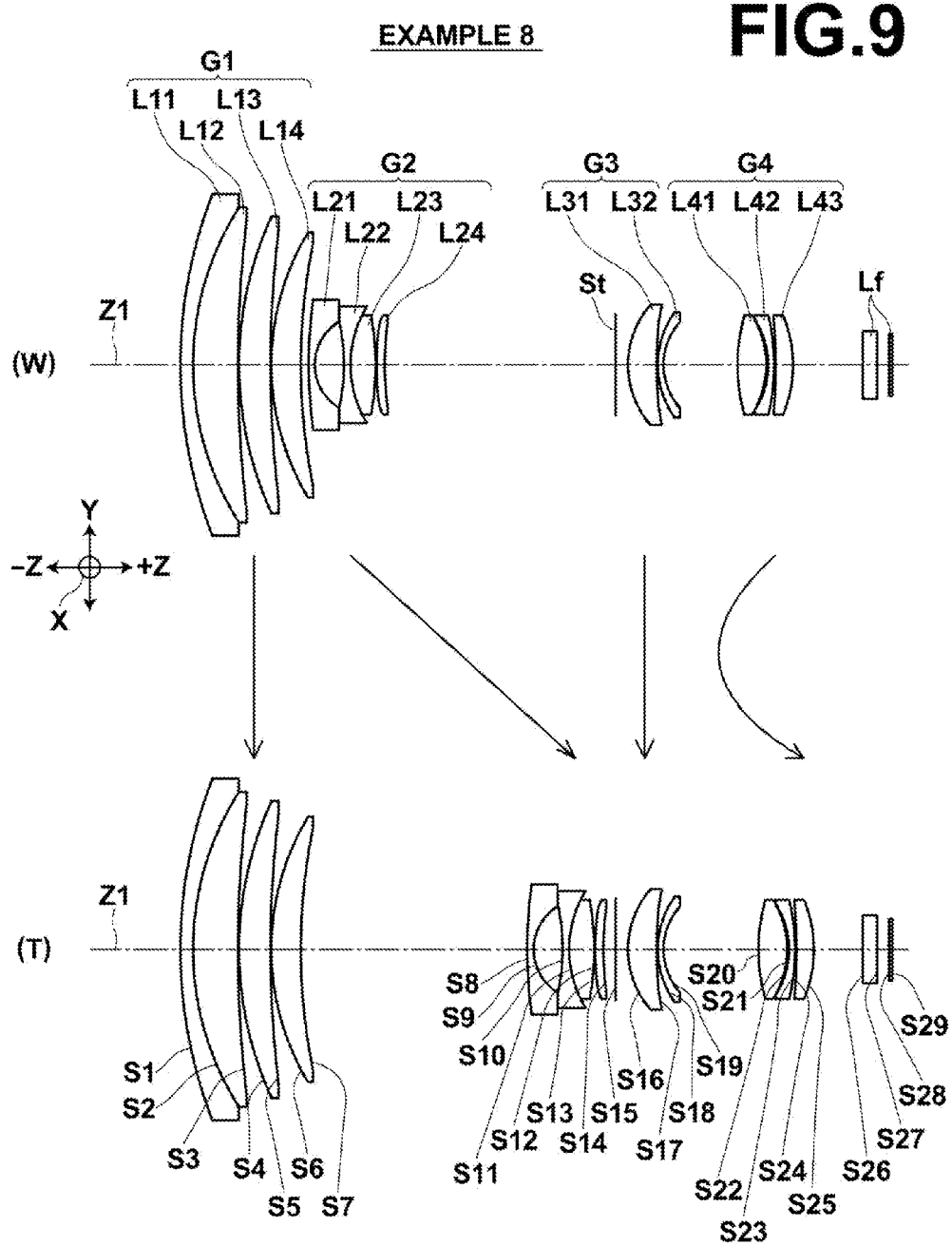
FIG. 9 is a cross-sectional view of a zoom lens of Example 8, comparatively illustrating the state in which the zoom is set to a wide angle end and the state in which it is set to a telephoto end.
Figure 10:
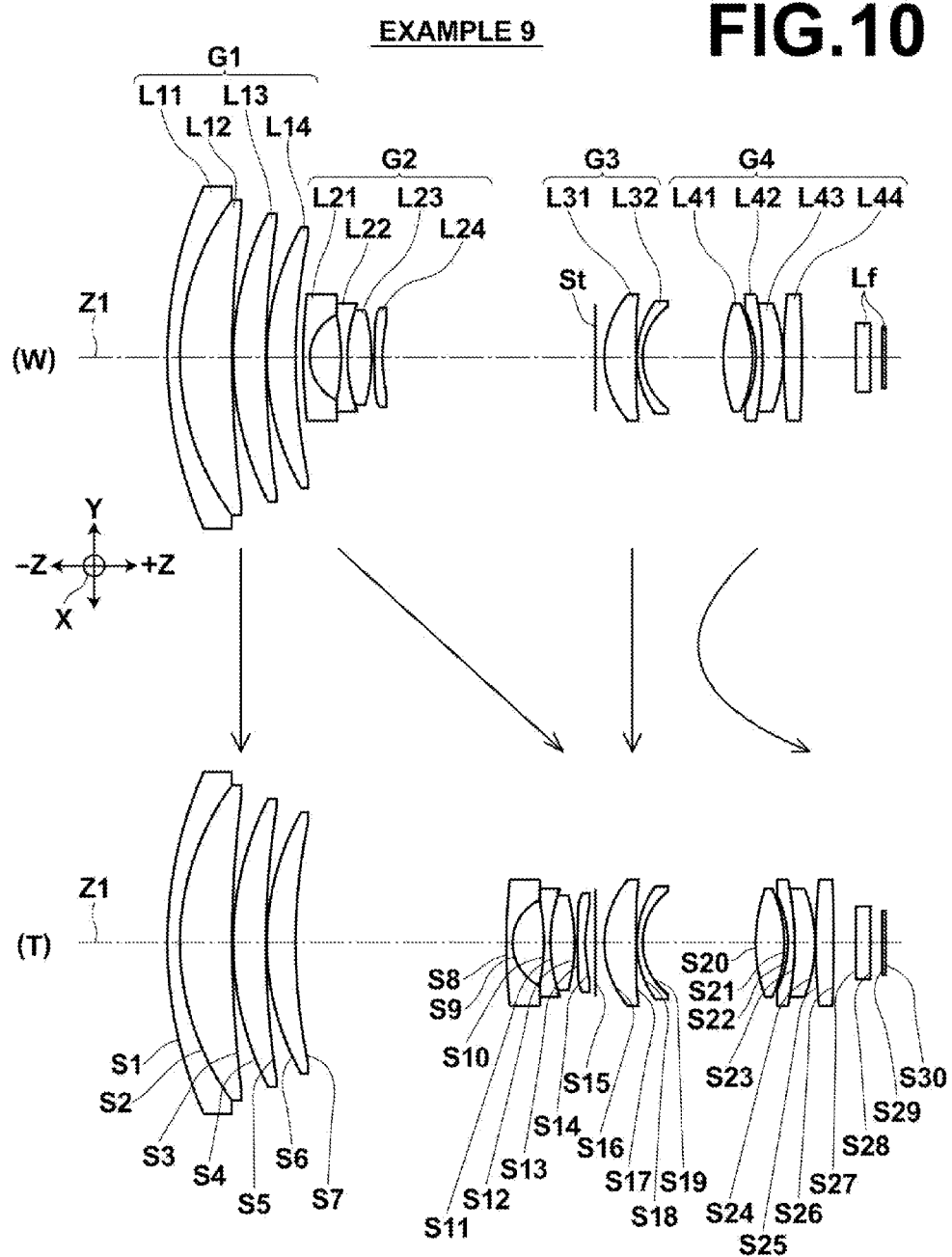
FIG. 10 is a cross-sectional view of a zoom lens of Example 9, comparatively illustrating the state in which the zoom is set to a wide angle end and the state in which it is set to a telephoto end.
Figure 11:
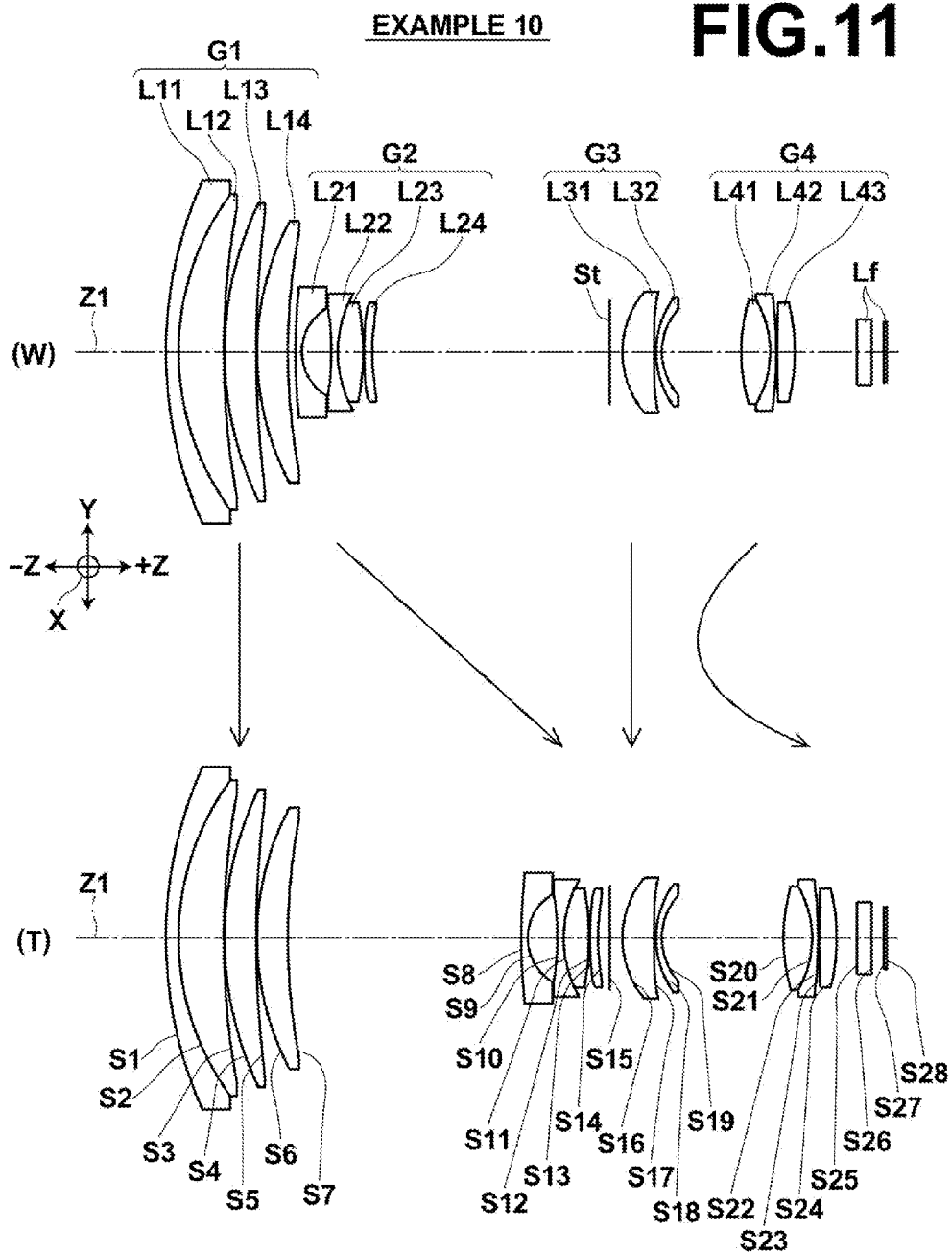
FIG. 11 is a cross-sectional view of a zoom lens of Example 10, comparatively illustrating the state in which the zoom is set to a wide angle end and the state in which it is set to a telephoto end.
Figure 12:
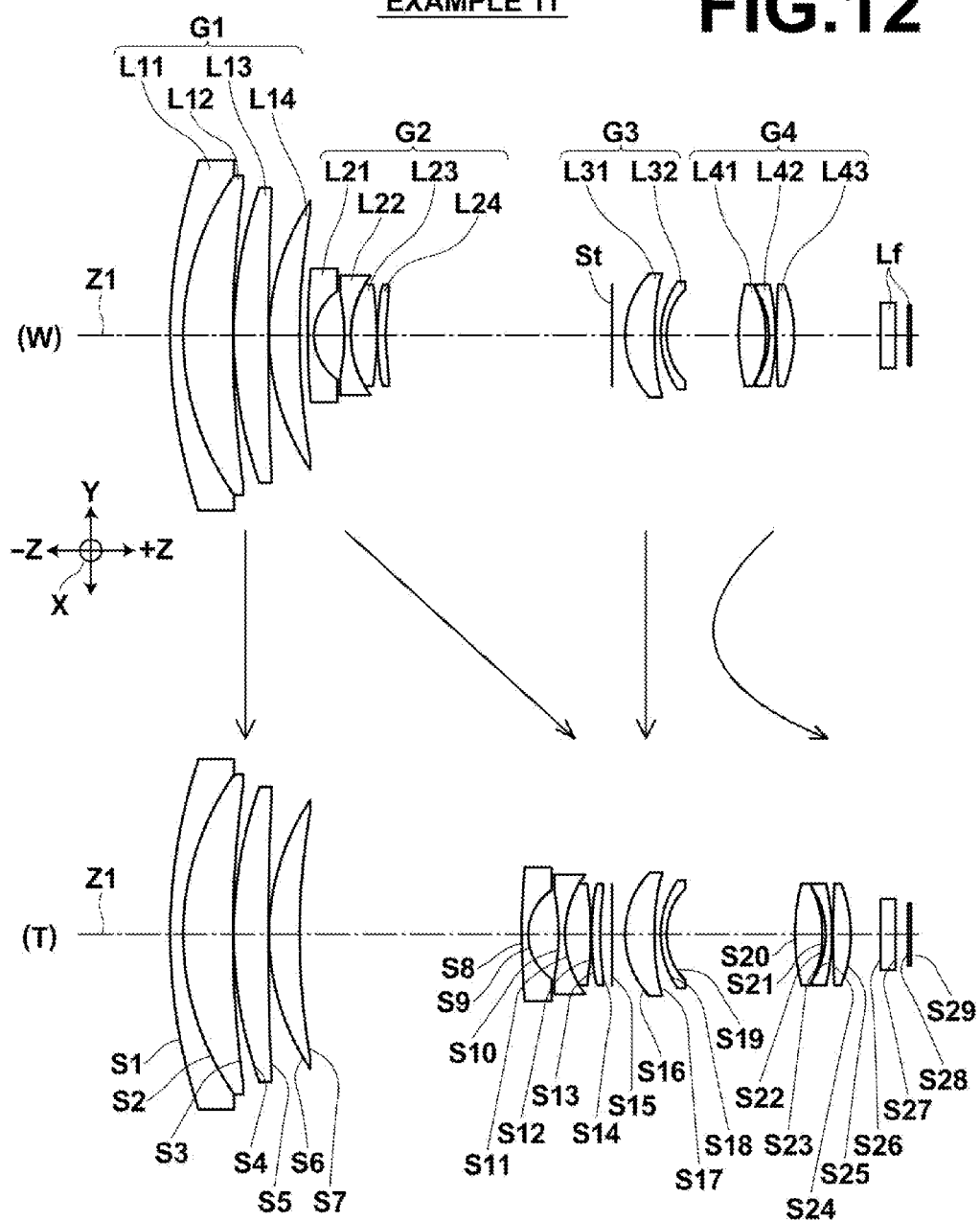
FIG. 12 is a cross-sectional view of a zoom lens of Example 11, comparatively illustrating the state in which the zoom is set to a wide angle end and the state in which it is set to a telephoto end.

Hereinafter, embodiments of the present invention will be described with reference to the accompanying drawings. FIG. 1 is a cross-sectional view of an image pickup apparatus of the present invention equipped with a zoom lens of the present invention, illustrating a schematic configuration thereof. Note that FIG. 1 illustrates an optical path passing the optical axis and an optical path passing outside the optical axis.

FIG. 1 commonly illustrates an image pickup apparatus 300A according to a first embodiment equipped with a zoom lens 100A according to a first embodiment of the present invention, an image pickup apparatus 300B according to a second embodiment equipped with a zoom lens 100B according to a second embodiment of the present invention, and an image pickup apparatus 300C according to a third embodiment equipped with a zoom lens 100C according to a third embodiment of the present invention.

The image pickup apparatus 300A according to the first embodiment of the present invention includes the zoom lens 100A and an image sensor 200 having an imaging plane 210 on which a large number of light receiving pixels are disposed for capturing an optical image 1K of a subject 1 formed through the zoom lens 100A.

The image pickup apparatus 300B according to the second embodiment of the present invention includes the zoom lens 100B and the image sensor 200 having the imaging plane 210 on which a large number of light receiving pixels are disposed for capturing an optical image 1K of a subject 1 formed through the zoom lens 100B.

The image pickup apparatus 300C according to the third embodiment of the present invention includes the zoom lens 100C and the image sensor 200 having the imaging plane 210 on which a large number of light receiving pixels are disposed for capturing an optical image 1K of a subject 1 formed through the zoom lens 100C.

The zoom lens 100A according to the first embodiment, zoom lens 100B according to the second embodiment, and zoom lens 100C according to the third embodiment are different in configuration. In the following description, an embodiment that satisfies all of the configurations according to the first to third embodiments will be described first followed by each individual embodiment.

<Embodiment that Satisfies all of the Configurations of Respective Embodiments>

A zoom lens according to an embodiment that satisfies all of the configurations of the respective embodiments and an image pickup apparatus equipped with the zoom lens will now be described.

The zoom lens that satisfies all of the configurations of the zoom lenses 100A, 100B, and 100C according to the first to third embodiments of the present invention is referred to as the "zoom lens 100". In addition, the image pickup apparatus that satisfies all of the configurations of the image pickup apparatuses 300A, 300B, and 300C according to the first to third embodiments is referred to as the "image pickup apparatus 300".

Note that FIG. 1 also illustrates the zoom lens 100 in addition to zoom lenses 100A, 100B, and 100C. FIG. 1 also illustrates the image pickup apparatus 300 in addition to image pickup apparatuses 300A, 300B, and 300C.

The image pickup apparatus 300 shown in FIG. 1 includes the zoom lens 100 and the image sensor 200 having the imaging plane 210 on which a large number of light receiving pixels are disposed for capturing the optical image 1K of the subject 1 formed on the imaging plane 210 through the zoom lens 100.

The zoom lens 100 includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, and a fourth lens group G4 which is moved along the optical axis Z1 at the time of zooming to correct a change in image plane position arising from the zooming for focusing, disposed in this order from the object side.

The zoom lens 100 may further include a filter Lf. The filter Lf is a parallel plate filter for blocking unnecessary light to be incident on the imaging plane 210, and a filter having a function of low-pass filter or of infrared light cut filter may be employed.

The first lens group G1 is composed of a first group first lens L11 having a negative power, a first group second lens L12 having a positive power, a first group third lens L13 having a positive power, and a first group fourth lens L14 having a positive power, disposed in this order from the object side.

The second lens group G2 is composed of a second group first lens L21 having a negative power, a second group second lens L22 having a negative power, a second group third lens L23 having a positive power, and a second group fourth lens L24 having a positive or negative power with at least one surface being aspheric, disposed in this order from the object side. Note that the second group second lens L22 and the second group third lens L23 are cemented.

The second group fourth lens L24 is a plastic lens with an object side surface being aspheric and formed such that the intersection between a vertical line drawn to the optical axis Z1 from the outermost edge of the effective area, which is the position most remote from the optical axis Z1 within the effective area of the aspheric surface, and the optical axis Z1 locates on the image plane side of the intersection between the aspheric surface and optical axis Z1.

The third lens group G3 is composed of a third group first lens L31 having a positive power with at least one surface being aspheric and a third group second lens L32 having a negative power.

The zoom lens 100 satisfies conditional expressions to (M).

The conditional expression (A): $0.62<TL/ft<0.88$ corresponds to the conditional expressions (1), (3), and (12) described above.

The conditional expression (B): $30<vd21<48$ corresponds to the conditional expressions (2), (7), and (9) described above.

The conditional expression (C): $4.2<f3/fw<8.0$ corresponds to the conditional expressions (4) and (11) described above.

The conditional expression (D): $0.17<M2/ft<0.32$ corresponds to the conditional expressions (5) and (10) described above.

The conditional expression (E): $17<vd11<27$ corresponds to the conditional expressions (6) and (8) described above.

The conditional expression (F): $10.0<|f24/f2|$ corresponds to the conditional expression (13) described above.

The conditional expression (G): $1.70<Nd14$ corresponds to the conditional expression (14) described above.

The conditional expression (H): $42<vd14<58$ corresponds to the conditional expression (15) described above.

The conditional expression (I): 75<vd1m corresponds to the conditional expression (16) described above.

The conditional expression (J): 0.25<f1/ft<0.50 corresponds to the conditional expression (17) described above.

The conditional expression (K): 1.89<Nd22 corresponds to the conditional expression (18) described above.

The conditional expression (L): $0.25<|f2|/(fw \cdot ft)^{1/2}<0.38$ corresponds to the conditional expression (19) described above.

The conditional expression (M): 1.30<fw/IH<1.75 corresponds to the conditional expression (20) described above.

Each symbol in the conditional expressions (A) to (M) has the following meaning:

ft: a focal length of the overall lens system at a telephoto end;

TL: a distance from the object side surface of the first group first lens to the image forming plane on the optical axis;

vd21: an Abbe number of the second group first lens with respect to d-line;

f3: a focal length of the third lens group;

fw: a focal length of the overall lens system at a wide angle end;

M2: an amount of movement of the second lens group at the time of zooming from the wide angle end to the telephoto end;

vd11: an Abbe number of the first group first lens with respect to d-line;

f24: a focal length of the second group fourth lens;

f2: a focal length of the second lens group;

Nd14: a refractive index of the first group fourth lens with respect to d-line;

vd14: an Abbe number of the first group fourth lens with respect to d-line;

vd1m: an Abbe number of at least one positive lens in the first lens group with respect to d-line;

f1: a focal length of the first lens group;

Nd22: a refractive index of the second group second lens; and

IH: a maximum image height.

The maximum image height IH is the distance from the optical axis Z1 to the farthest point in an optical image formed on the imaging plane, and the "optical image formed on the imaging plane" here is the optical image 1K of the subject 1 formed on the imaging plane 210 and captured through the zoom lens 100.

The overall optical length TL which is the "distance from the object side surface of the first group first lens to the image forming plane on the optical axis" corresponds to the distance from the object side surface of the first group first lens L11 to the image forming plane (imaging plane 210) on the optical axis Z1. Note that the distance described above is an actual distance (real distance), not an air equivalent distance.

The conditional expression (A): 0.62<TL/ft<0.88 specifies the relationship between the overall optical length TL and the focal length of the overall lens system at the telephoto end.

If the zoom lens 100 is configured to fall below the lower limit of the conditional expression (A) for downsizing, correction of field curvature becomes difficult. Further, the power of each lens becomes too strong and becomes sensitive (sensitivity is increased) to the performance degradation due to manufacturing error or assembly error, thereby causing a problem of very high level of difficulty in manufacturing. Still further, this also causes a problem of increased variation in the aberration at the time of zooming and focusing.

Contrary to this, if the zoom lens 100 is configured to exceed the upper limit of the conditional expression (A), there arises a problem that the lens system becomes large, though advantageous for aberration correction.

Preferably, the conditional expression (A) is restricted to the range of conditional expression (A') 0.64<TL/ft<0.86 and more preferably, to the range of conditional expression (A"): 0.67<TL/ft<0.86.

The conditional expression (B) 30<vd21<48 specifies the Abbe number of the material of the second group first lens L21.

If the zoom lens 100 is configured to fall outside the range of the conditional expression (B), there arises a problem that the correction of lateral chromatic aberration becomes difficult, in particular, the correction of lateral chromatic aberration near the wide angle end in a well-balanced manner with respect to each wavelength.

If the zoom lens 100 is configured to exceed the upper limit of the conditional expression (B), the refractive index is generally reduced as the value of vd21 is increased beyond the upper limit of the conditional expression (B). If trying to implement downsizing by applying such a material to the second group first lens L21 and giving a strong power thereto, the curvature of the lens becomes large, the thickness of the overall second lens group G2 is increased, and there arises a problem that the amount of variation in aberration becomes large.

Preferably, the conditional expression (B) is restricted to the range of conditional expression (B'): 30<vd21<46.

The conditional expression (C) 4.2<f3/fw<8.0 described above specifies the relationship between the focal length of the third lens group G3 and the focal length of the overall lens system at the wide angle end.

If the zoom lens 100 is configured to fall below the lower limit of the conditional expression (C), there arises a problem that the correction of spherical aberration near the wide angle end becomes difficult.

Contrary to this, if the zoom lens 100 is configured to exceed the upper limit of the conditional expression (C), the power of the third lens group G3 becomes weak which is advantageous for the aberration correction but disadvantageous for downsizing since the overall length of the lens becomes long. In order to avoid this, an excessive increase in the power of the fourth lens group G4 causes a problem that the variation in aberration at the time of zooming becomes large. Further, the light incident height on the fourth lens group G4 becomes large, thereby causing a problem that the size of the overall lens system is increased.

Preferably, the conditional expression (C) is restricted to the range of conditional expression (C') 4.3<f3/fw<7.8.

The conditional expression (D): 0.17<M2/ft<0.32 described above specifies the relationship between the amount of movement of the second lens group G2 at the time of zooming from the wide angle end to the telephoto end and the focal length of the overall lens system at the telephoto end.

If the zoom lens 100 is configured to fall below the lower limit of the conditional expression (D), the power of the second lens group G2 becomes strong and the amount of movement of the second lens group G2 is reduced. But, there arises a problem that the correction of field curvature becomes difficult.

Contrary to this, if the zoom lens 100 is configured to exceed the upper limit of the conditional expression (D), there arises a problem that the overall length of the lens becomes long.

Preferably, the conditional expression (D) is restricted to the range of conditional expression (D') 0.18<M2/ft<0.28.

The conditional expression (E): $17<vd11<27$ described above specifies the Abbe number of the first group first lens L11.

If the zoom lens 100 is configured to fall below the lower limit of the conditional expression (E), the thickness of the lens may be reduced. But, this causes a problem that the chromatic aberration, in particular, short wavelength axial chromatic aberration near the telephoto end becomes large.

Contrary to this, if the zoom lens 100 is configured to exceed the upper limit of the conditional expression (E), the curvatures of the first group first lens L11 and first group second lens L12 become large, and the central lens thickness is increased for ensuring a required edge thickness, thereby causing a problem of an increased size of the first lens group G1. Further, there arises a problem that the Petzval sum is increased in the negative direction.

Preferably, the conditional expression (E) is restricted to the range of conditional expression (E'): $18<vd11<26$, and more preferably, to the range of conditional expression (E''): $19<vd11<25$.

The conditional expression (F): $10.0<|f24/f2|$ specifies the relationship between the focal length of the second group fourth lens L24 and the focal length of the second lens group G2.

If the zoom lens 100 is configured to satisfy the conditional expression (F), the variations in the performance and optical characteristics due to temperature change may be minimized even in the case where the second group fourth lens L24 is formed of a plastic.

Contrary to this, if the zoom lens 100 is configured to fall below the lower limit of the conditional expression (F), there arises a problem that the astigmatism at the telephoto end is increased.

The conditional expression (G): $1.70<Nd14$ described above specifies the refractive index of the first group fourth lens.

If the zoom lens 100 is configured to fall below the lower limit of the conditional expression (G), there arises a problem that the spherical aberration at the telephoto end is excessively corrected.

Preferably, the conditional expression (G) is restricted to the range of conditional expression (G'): $1.71<Nd14$.

The conditional expression (H): $42<vd14<58$ described above specifies the Abbe number of the first group fourth lens L14.

If the zoom lens 100 is configured to fall outside the range of the conditional expression (H), the correction of axial chromatic aberration near the telephoto end becomes difficult. Further, this causes a problem that maintaining well-balance with the lateral chromatic aberration near the wide angle end becomes difficult.

Preferably, the conditional expression (H) is restricted to the range of conditional expression (H'): $42<vd14<56$.

The conditional expression (I): $75<vd1m$ described above specifies the Abbe number of a positive lens disposed in the first lens group G1.

If the zoom lens 100 is configured to fall below the lower limit of the conditional expression (I), for example, configured such that all of the three positive lenses disposed in the first lens group G1 (first group second lens L12, first group third lens L13, and first group fourth lens L14) fall below the lower limit of the conditional expression (I), there arises a problem that axial chromatic aberration near the telephoto end becomes too large.

Preferably, the conditional expression (I) is restricted to the range of conditional expression (I'): $78<vd1m$.

The conditional expression (J): $0.25<f1/ft<0.50$ described above specifies the relationship between the focal length of the first lens group G1 and focal length of the overall lens system at the telephoto end.

If the zoom lens 100 is configured to fall below the lower limit of the conditional expression (J), an excessive burden falls on the first lens group G1, thereby causing a problem that the correction of chromatic aberration and spherical aberration near the telephoto end becomes difficult, though advantageous for downsizing.

Contrary to this, if the zoom lens 100 is configured to exceed the upper limit of the conditional expression (J), there arises a problem that the overall lens length becomes long.

Preferably, the conditional expression (J) is restricted to the range of conditional expression (J'): $0.28<f1/ft<0.45$.

The conditional expression (K): $1.89<Nd22$ described above specifies the refractive index of the second group second lens L22.

If the zoom lens 100 is configured to satisfy the conditional expression (K), the thickness of the second lens group G2 may be reduced.

Preferably, the conditional expression (K) is restricted to the range of conditional expression (K') $1.89<Nd22<1.95$. If the zoom lens 100 is configured to exceed the upper limit of the conditional expression (K'), dispersion of, for example, the second group second lens L22 is increased and the correction of lateral chromatic aberration near the wide angle end may become difficult.

The conditional expression (L) $0.25<|f2|/(fw \cdot ft)^{1/2}<0.38$ described above specifies the relationship between the focal length of the second lens group G2 and focal lengths of the overall lens system at the wide angle end and telephoto end.

If the zoom lens 100 is configured to fall below the lower limit of the conditional expression (L), the power of the second lens group G2 becomes strong and the amount of movement of the second lens group G2 at the time of zooming is reduced. But, there arises a problem that the correction of field curvature becomes difficult.

Contrary to this, if the zoom lens 100 is configured to exceed the upper limit of the conditional expression (L), there arises a problem that the overall length of the lens is increased.

Preferably, the conditional expression (L) is restricted to the range of conditional expression (L'): $0.26<|f2|/(fw \cdot ft)^{1/2}<0.36$.

The conditional expression (M): $1.30<fw/IH<1.75$ described above specifies the relationship between the focal length at the wide angle end and maximum image height.

If the zoom lens 100 is configured to fall below the lower limit of the conditional expression (M), there arise problems of difficulties in downsizing the front lens diameter and correcting distortion.

Contrary to this, if the zoom lens 100 is configured to exceed the upper limit of the conditional expression (M), there arises a problem that the overall length of the lens is increased.

Preferably, the conditional expression (M) is restricted to the range of conditional expression (M'): $1.35<fw/IH<1.70$.

<Individual Configurations of Respective Embodiments 1 to 3>

Hereinafter, the configuration of each embodiment will be described separately.

The configuration of the zoom lens 100A of the first embodiment of the present invention will be described first.

The zoom lens 100A includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, a fourth lens group G4 which is moved along the optical axis Z1 at the time of zooming to correct a change in image plane position arising from the zooming for focusing, and a filter Lf, disposed in this order from the object side.

The first lens group G1 is composed of a first group first lens L11 having a negative power, a first group second lens L12 having a positive power, a first group third lens L13 having a positive power, and a first group fourth lens L14 having a positive power, disposed in this order from the object side.

The second lens group G2 is composed of a second group first lens L21 having a negative power, a second group second lens L22 having a negative power, a second group third lens L23 having a positive power, and a second group fourth lens L24 having a positive or negative power with at least one surface being aspheric, disposed in this order from the object side.

The zoom lens 100A is configured to simultaneously satisfy the conditional expression (A) and conditional expression (B) described above.

The configuration described above is the essential configuration of the zoom lens 100A.

A desirable configuration of the zoom lens 100A will now be described.

Preferably, the zoom lens 100A satisfies the conditional expression (E) described above and more preferably, the conditional expression (E') described above.

Preferably, the zoom lens 100A satisfies the conditional expression (D) described above and more preferably, the conditional expression (D') described above.

Preferably, the zoom lens 100A satisfies the conditional expression (C) described above and more preferably, the conditional expression (C') described above.

Preferably, the third lens group G3 is composed of a third group first lens L31 having a positive power with at least one surface being aspheric and a third group second lens L32 having a negative power.

Preferably, the second lens group G2 includes a second group fourth lens L24 with at least one surface being aspheric disposed on the imaging surface side of the second group third lens L23.

Preferably, in the case where the second lens group G2 includes the second group fourth lens L24 with at least one surface being aspheric disposed on the image plane side of the second group third lens L23, an object side surface is aspheric and an intersection between a vertical line drawn to the optical axis Z1 from an outermost edge of an effective area of the aspheric surface and the optical axis Z1 locates on the image plane side of an intersection between the aspheric surface and optical axis Z1.

Preferably, in the case where the second lens group G2 includes the second group fourth lens L24 with at least one surface being aspheric disposed on the image plane side of the second group third lens L23, the second group fourth lens L24 is a plastic lens.

Preferably, in the case where the second lens group G2 includes the second group fourth lens L24 with at least one surface being aspheric disposed on the image plane side of the second group third lens L23, the zoom lens 100A satisfies the conditional expression (F) described above and more preferably, the conditional expression) (F') described above.

Preferably, the zoom lens 100A satisfies the conditional expression (G) and conditional expression (H) described above at the same time, and more preferably, the conditional expression (G') and conditional expression (H') described above at the same time.

Preferably, the zoom lens 100A satisfies the conditional expression (I) described above and more preferably, the conditional expression (I') described above.

Preferably, the zoom lens 100A satisfies the conditional expression (J) described above and more preferably, the conditional expression (J') described above.

Preferably, the second group second lens L22 and second group third lens L23 in the second lens group G2 are cemented and the second lens group G2 satisfies the conditional expression (K) described above and more preferably, the conditional expression (K') described above.

Preferably, the zoom lens 100A satisfies the conditional expression (L) described above and more preferably, the conditional expression (L') described above.

Preferably, the zoom lens 100A satisfies the conditional expression (M) described above and more preferably, the conditional expression (M') described above.

Next, an individual configuration of the zoom lens 100B of the second embodiment will be described.

The zoom lens 100B includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, a fourth lens group G4 which is moved along the optical axis Z1 at the time of zooming to correct a change in image plane position arising from the zooming for focusing, and a filter Lf, disposed in this order from the object side.

The first lens group G1 is composed of a first group first lens L11 having a negative power, a first group second lens L12 having a positive power, a first group third lens L13 having a positive power, and a first group fourth lens L14 having a positive power, disposed in this order from the object side.

The second lens group G2 is composed of a second group first lens L21 having a negative power, a second group second lens L22 having a negative power, and a second group third lens L23 having a positive power disposed, in this order from the object side.

The third lens group G3 is composed of a third group first lens L31 having a positive power with at least one surface being aspheric and a third group second lens L32 having a negative power.

The zoom lens 100B is configured to satisfy the conditional expression (A) and conditional expression (B) described above at the same time.

The configuration described above is the essential configuration of the zoom lens 100B.

A desirable configuration of the zoom lens 100B will now be described.

Preferably, the zoom lens 100B satisfies the conditional expression (E) described above and more preferably, the conditional expression (E') described above.

Preferably, the zoom lens 100B satisfies the conditional expression (B) described above and more preferably, the conditional expression (B') described above.

Preferably, the zoom lens 100B satisfies the conditional expression (D) described above and more preferably, the conditional expression (D') described above.

Preferably, the third lens group G3 is composed of a third group first lens L31 having a positive power with at least one surface being aspheric and a third group second lens L32 having a negative power.

Preferably, the second lens group G2 includes a second group fourth lens L24 with at least one surface being aspheric on the imaging surface side of the second group third lens L23.

Preferably, in the case where the second lens group G2 includes the second group fourth lens L24 with at least one surface being aspheric disposed on the image plane side of the second group third lens L23, an object side surface of the fourth lens L24 is aspheric and the intersection between the vertical line drawn to the optical axis Z1 from the outermost edge of the effective area of the aspheric surface and the optical axis Z1 locates on the image plane side of the intersection between the aspheric surface and optical axis Z1.

Preferably, in the case where the second lens group G2 includes the second group fourth lens L24 with at least one surface being aspheric disposed on the image plane side of the second group third lens L23, the second group fourth lens L24 is a plastic lens.

Preferably, in the case where the second lens group G2 includes the second group fourth lens L24 with at least one surface being aspheric disposed on the image plane side of the second group third lens L23, the zoom lens 100B satisfies the conditional expression (F) described above and more preferably, the conditional expression (F') described above.

Preferably, the zoom lens 100B satisfies the conditional expression (G) and conditional expression (H) described above at the same time and more preferably, the conditional expression (G') and conditional expression (H') described above at the same time.

Preferably, the zoom lens 100B satisfies the conditional expression (I) described above and more preferably, the conditional expression (I') described above.

Preferably, the zoom lens 100B satisfies the conditional expression (J) described above and more preferably, the conditional expression (J') described above.

Preferably, the second group second lens L22 and second group third lens L23 in the second lens group G2 are cemented and the second lens group G2 satisfies the conditional expression (K) described above and more preferably, the conditional expression (K') described above.

Preferably, the zoom lens 100B satisfies the conditional expression (L) described above and more preferably, the conditional expression (L') described above.

Preferably, the zoom lens 100B satisfies the conditional expression (M) described above and more preferably, the conditional expression (M') described above.

Next, an individual configuration of the zoom lens 100C of the third embodiment will be described.

The zoom lens 100C includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, a fourth lens group G4 which is moved along the optical axis Z1 at the time of zooming to correct a change in image plane position arising from the zooming for focusing, and a filter Lf, disposed in this order from the object side.

The first lens group G1 is composed of a first group first lens L11 having a negative power, a first group second lens L12 having a positive power, a first group third lens L13 having a positive power, and a first group fourth lens L14 having a positive power, disposed in this order from the object side.

The second lens group G2 is composed of a second group first lens L21 having a negative power, a second group second lens L22 having a negative power, and a second group third lens L23 having a positive power, disposed in this order from the object side.

The zoom lens 100C is configured to satisfy the conditional expression (B), conditional expression (D), and conditional expression (E) described above at the same time.

The configuration described above is the essential configuration of the zoom lens 100C.

A desirable configuration of the zoom lens 100C will now be described.

Preferably, the zoom lens 100C satisfies the conditional expression (C) described above and more preferably, the conditional expression (C') described above.

Preferably, the zoom lens 100C satisfies the conditional expression (A) described above and more preferably, the conditional expression (A') described above.

Preferably, the third lens group G3 is composed of a third group first lens L31 having a positive power with at least one surface being aspheric and a third group second lens L32 having a negative power.

Preferably, the second lens group G2 includes a second group fourth lens L24 with at least one surface being aspheric on the imaging surface side of the second group third lens L23.

Preferably, in the case where the second lens group G2 includes the second group fourth lens L24 with at least one surface being aspheric disposed on the image plane side of the second group third lens L23, an object side surface of the fourth lens L24 is aspheric and the intersection between the vertical line drawn to the optical axis Z1 from the outermost edge of the effective area of the aspheric surface and the optical axis Z1 locates on the image plane side of the intersection between the aspheric surface and optical axis Z1.

Preferably, in the case where the second lens group G2 includes the second group fourth lens L24 with at least one surface being aspheric disposed on the image plane side of the second group third lens L23, the second group fourth lens L24 is a plastic lens.

Preferably, in the case where the second lens group G2 includes the second group fourth lens L24 with at least one surface being aspheric disposed on the image plane side of the second group third lens L23, the zoom lens 100C satisfies the conditional expression (F) described above and more preferably, the conditional expression (F') described above.

Preferably, the zoom lens 100C satisfies the conditional expression (G) and conditional expression (H) described above at the same time and more preferably, the conditional expression (G') and conditional expression (H') described above at the same time.

Preferably, the zoom lens 100C satisfies the conditional expression (I) described above and more preferably, the conditional expression (I') described above.

Preferably, the zoom lens 100C satisfies the conditional expression (J) described above and more preferably, the conditional expression (J') described above.

Preferably, the second group second lens L22 and second group third lens L23 in the second lens group G2 are cemented and the second lens group G2 satisfies the conditional expression (K) described above and more preferably, the conditional expression (K') described above.

Preferably, the zoom lens 100C satisfies the conditional expression (L) described above and more preferably, the conditional expression (L') described above.

Preferably, the zoom lens 100C satisfies the conditional expression (M) described above and more preferably, the conditional expression (M') described above.

SPECIFIC EXAMPLES

Hereinafter, numerical data and the like of Examples 1 to 11 of the zoom lens according to the present invention will be described with reference to FIGS. 2 to 23 and Tables 1 to 12.

FIGS. 2 to 12 are cross-sectional views of zoom lenses of Examples 1 to 11, illustrating schematic configurations thereof. Each drawing comparatively illustrates the state in which the zoom is set to a wide angle end and the state in which it is set to a telephoto end.

The drawing indicated by the symbol (W) on the upper side of each of FIGS. 2 to 12 represents the state in which the zoom is set to the wide angle end while the drawing indicated by the symbol (T) on the lower side of each of FIGS. 2 to 12 represents the state in which the zoom is set to the telephoto end.

Symbols in FIGS. 2 to 12 corresponding to those in FIG. 1 illustrating the zoom lens 100 represent the corresponding elements.

Examples that satisfy the essential configuration of the zoom lens 100A of the first embodiment are Examples 1 to 7 and Examples 9 to 11, i.e., Examples 1 to 11 except for Example 8.

Examples that satisfy the essential configuration of the zoom lens 100B of the second embodiment are also Examples 1 to 7 and Examples 9 to 11, i.e., Examples 1 to 11 except for Example 8.

Examples that satisfy the essential configuration of the zoom lens 100C of the third embodiment are Examples 1 to 11 (all Examples).

The symbols L11, L12, - - - are those that indicate lenses in each lens group and correspond to the order of lenses arranged from the object side.

Tables 1 to 11 illustrate basic data of zoom lenses of Examples 1 to 11. In each of Tables 1 to 11, lens data are shown on the upper left (indicated by the symbol (a) in the drawing) while each coefficient of the aspheric surface expression representing the lens surface shape (aspheric surface shape) is shown on the upper right (indicated by the symbol (b) in the drawing). Further, in each of Tables 1 to 11, various values with respect to zoom at the wide angle end and telephoto end are shown, in which f is the focal length (in mm) of the overall lens system; Fno. is the value of F number; 2ω is the value of total field angle; and D7, D14, D19, D25, and the like are values of the surface distance between each lens group.

Note that a numerical value or a symbol Dn (n is a numerical value) appears in the column of the surface distance Di (i=1, 2, 3, - - -) in lens data indicated by the symbol (a) in each drawing and a place where the symbol Dn appears corresponds to the surface distance (air space) between lens groups and the surface distance (air space) varies with the zoom magnification setting.

In the lens data indicated by the symbol (a) in each drawing, the surface number of the optical member, such as a lens or the like, is represented by the symbol i (i=1, 2, 3, - - -) which is sequentially increased from the object side toward the image side. Note that the lens data include the surface number of the aperture stop St (i=15) and the surface numbers of the object side surface and image side surface of the parallel plate filter Lf. There may be a case in which the filter Lf is formed of two parallel plates.

An asterisk * is attached to the surface number for an aspheric lens surface.

The radius of curvature Ri represents the radius of curvature of $i^{th}$ (i=1, 2, 3, - - -) surface and the surface distance Di (i=1, 2, 3, - - -) represents the surface distance between $i^{th}$ surface and $(i+1)^{th}$ surface on the optical axis Z1. The symbols Ri and Di in the lens data correspond to the symbol Si (i=1, 2, 3, - - -) representing the lens surface or the like.

Note that the value of radius of curvature of an aspheric surface indicated by the * mark attached to the surface number thereof is the paraxial radius of curvature.

Note that a numerical value indicating the surface distance or a symbol Dn (n is a numerical value) appears in the column of the surface distance Di (i=1, 2, 3, - - -), and a place where the symbol Dn appears corresponds to the surface distance (air space) between lens groups and the surface distance (air space) varies with a change in the zoom magnification.

Ndj represents the refractive index of $j^{th}$ (j=1, 2, 3, optical element, in which j increases sequentially from the object side toward the image side, with respect to the wavelength of 587.6 nm (d-line), while vdj represents the Abbe number of $j^{th}$ optical element with reference to the d-line.

In the lens data in Tables 1 to 11, the radius of curvature and surface distance are indicated in rum, and the radius of curvature is indicated as positive if it is convex to the object side and as negative if it is convex to the image side.

Each aspheric surface is defined by the aspheric surface expression given below:

$$Z = \frac{Y^2/R}{1 + (1 - KA \cdot Y^2/R^2)^{1/2}} + \sum_{i=3}^{n} RAi \cdot Y^i$$

where,
Z: depth of aspheric surface (a length of the vertical line from a point on the aspheric surface at height Y to a flat surface orthogonal to an optical axis to which the aspheric vertex contact) (mm),
Y: height (distance from the optical axis) (mm),
R: paraxial radius of curvature, and
KA, RAi: aspheric coefficients (i=3 to n).

Table 12 indicates values calculated by formulas described in inequality expressions of the conditional expressions (A) to (M) for each zoom lens of Examples 1 to 11.

Note that Tables 1 to 12 will be collectively provided at the end of this section, the "Best Mode for Carrying out the Invention".

FIGS. 13 to 23 show various aberrations of zoom lenses of Examples 1 to 11. Each drawing illustrates aberrations with respect to the wavelengths corresponding to the d-line, g-line, and C-line respectively.

The aberration diagrams corresponding to the symbols A to D in each of FIGS. 13 to 23 illustrate aberrations at the wide angle end, in which A is spherical aberration, B is astigmatism, C is distortion, and D is lateral chromatic aberration. The aberration diagrams corresponding to the symbols E to H in each drawing illustrate aberrations at the telephoto end, in which E is spherical aberration, F is astigmatism, G is distortion, and H is lateral chromatic aberration.

Each distortion diagram illustrates a deviation from an ideal image height obtained by f×tan θ, where f is a focal length of the overall lens system and θ is a half angle of view (treated as a variable, 0≤θ≤ω).

As is known from the numerical data, aberration diagrams, and the like, the zoom lenses of the present invention may form a high quality optical image even though they are compact and have a high zoom ratio.

It should be understood that the present invention is not limited to each of the embodiments described above, and various changes and modifications may be made without departing from the spirit of the invention. For example, values of radius of curvature of each lens, surface distance, refractive index, and the like are not limited to those shown in each table and may take other values.

TABLE 1

(a) Example 1 Basic Lens Data

| Si Surf. No. | Ri R. of Cur. | Di Surf. Dis. | Ndi Ref. index | νdi Abbe No. |
|---|---|---|---|---|
| 1 | 55.2167 | 1.30 | 1.84666 | 23.8 |
| 2 | 31.4640 | 5.51 | 1.49700 | 81.5 |
| 3 | 142.5803 | 0.10 | | |
| 4 | 42.8762 | 3.80 | 1.49700 | 81.5 |
| 5 | 313.8776 | 0.10 | | |
| 6 | 28.4401 | 3.55 | 1.72916 | 54.7 |
| 7 | 74.8798 | D7 | | |
| 8 | 84.1410 | 0.60 | 1.88300 | 40.8 |
| 9 | 5.8698 | 2.80 | | |
| 10 | −82.1272 | 0.61 | 1.90366 | 31.3 |
| 11 | 8.1500 | 3.05 | 1.92286 | 18.9 |
| 12 | ∞ | 0.10 | | |
| *13 | 31.6059 | 1.10 | 1.53389 | 56.0 |
| *14 | 30.7974 | D14 | | |
| 15 | ∞(aper. stop) | 1.40 | | |
| *16 | 9.1821 | 3.00 | 1.80348 | 40.5 |
| *17 | 29.9807 | 0.70 | | |
| 18 | 10.2594 | 0.60 | 1.94595 | 18.0 |
| 19 | 6.9000 | D19 | | |
| 20 | 18.5895 | 2.40 | 1.48749 | 70.2 |
| 21 | −18.5895 | 0.68 | | |
| 22 | −9.9250 | 0.55 | 1.92286 | 20.9 |
| 23 | −14.9000 | 0.10 | | |
| 24 | ∞ | 1.80 | 1.62299 | 58.2 |
| 25 | −14.9014 | D25 | | |
| 26 | ∞ | 1.70 | 1.51680 | 64.2 |
| 27 | ∞ | 2.35 | | |

(b) Example 1 Aspheric Data

| Asphe. Coeff. | S13 |
|---|---|
| KA | 1.2590480 |
| RA3 | −5.4323387E−03 |
| RA4 | 1.8458669E−02 |
| RA5 | −8.3800156E−02 |
| RA6 | 2.2884078E−01 |
| RA7 | −4.0828552E−01 |
| RA8 | 5.0957713E−01 |
| RA9 | −4.6399401E−01 |
| RA10 | 3.1667363E−01 |
| RA11 | −1.6480690E−01 |
| RA12 | 6.6048569E−02 |
| RA13 | −2.0454941E−02 |
| RA14 | 4.8821794E−03 |
| RA15 | −8.8938937E−04 |
| RA16 | 1.2134201E−04 |
| RA17 | −1.1997289E−05 |
| RA18 | 8.1144363E−07 |
| RA19 | −3.3572686E−08 |
| RA20 | 6.4064200E−10 |

| Asphe. Coeff. | S14 |
|---|---|
| KA | 1.1819002 |
| RA3 | −3.8851571E−03 |
| RA4 | 4.8333654E−04 |
| RA5 | 2.5146645E−05 |
| RA6 | −7.7664992E−06 |
| RA7 | −2.0432233E−06 |
| RA8 | −3.4832048E−07 |
| RA9 | −2.5233303E−08 |
| RA10 | 2.4372757E−08 |

TABLE 1-continued

| Asphe. Coeff. | S16 |
|---|---|
| KA | 0.9905186 |
| RA3 | 9.6051366E−05 |
| RA4 | −4.2834240E−06 |
| RA5 | −9.4976029E−07 |
| RA6 | −1.1597977E−07 |
| RA7 | 4.4991318E−10 |
| RA8 | −5.2274392E−09 |
| RA9 | 1.2621872E−09 |
| RA10 | 3.1245105E−11 |

| Asphe. Coeff. | S17 |
|---|---|
| KA | 1.0141510 |
| RA3 | 1.9329569E−04 |
| RA4 | 1.1140144E−04 |
| RA5 | −2.0471403E−06 |
| RA6 | −2.0311164E−06 |
| RA7 | 6.4457224E−07 |
| RA8 | −3.5422669E−08 |
| RA9 | −3.4856769E−09 |
| RA10 | 3.8598034E−10 |

(c) Example 1 Zoom Data

| Item | W.A. End | T.P. End |
|---|---|---|
| f | 4.62 | 124.80 |
| Fno. | 1.68 | 4.15 |
| 2ω | 68.3 | 2.7 |
| D7 | 0.65 | 25.58 |
| D14 | 25.62 | 0.69 |
| D19 | 7.84 | 16.78 |
| D25 | 9.86 | 0.92 |

*Aspheric Surface

TABLE 2

(a) Example 2 Basic Lens Data

| Si Surf. No. | Ri R. of Cur. | Di Surf. Dis. | Ndi Ref. index | νdi Abbe No. |
|---|---|---|---|---|
| 1 | 59.8388 | 1.30 | 1.84666 | 23.8 |
| 2 | 31.4544 | 5.61 | 1.49700 | 81.5 |
| 3 | 292.1642 | 0.10 | | |
| 4 | 33.6830 | 3.70 | 1.71300 | 53.9 |
| 5 | 92.9498 | 0.10 | | |
| 6 | 33.7803 | 3.05 | 1.72916 | 54.7 |
| 7 | 65.5387 | D7 | | |
| 8 | 57.4195 | 0.60 | 1.90366 | 31.3 |
| 9 | 5.6798 | 3.20 | | |
| 10 | −23.7477 | 0.60 | 1.88300 | 40.8 |
| 11 | 9.0107 | 3.41 | 1.80810 | 22.8 |
| 12 | −16.9510 | 0.10 | | |
| *13 | 55.2091 | 0.90 | 1.50957 | 56.4 |
| *14 | 29.0562 | D14 | | |
| 15 | ∞(aper.stop) | 1.40 | | |
| *16 | 9.9395 | 3.20 | 1.80348 | 40.5 |
| *17 | 38.8896 | 0.22 | | |
| 18 | 10.1342 | 0.60 | 1.94595 | 18.0 |
| 19 | 7.0396 | D19 | | |
| 20 | 26.0411 | 3.20 | 1.48749 | 70.2 |
| 21 | −12.2766 | 0.30 | | |
| 22 | −9.8181 | 0.55 | 1.84666 | 23.8 |
| 23 | −22.1420 | 0.10 | | |
| 24 | 226.5453 | 1.95 | 1.62299 | 58.2 |
| 25 | −13.6112 | D25 | | |
| 26 | ∞ | 1.61 | 1.51680 | 64.2 |
| 27 | ∞ | 1.36 | | |
| 28 | ∞ | 0.32 | 1.51680 | 64.2 |
| 29 | ∞ | 1.00 | | |

TABLE 2-continued

(b) Example 2 Aspheric Data

| Asphe. Coeff. | S13 |
|---|---|
| KA | 1.2009596 |
| RA3 | −2.7107783E−03 |
| RA4 | 3.9159691E−04 |
| RA5 | 1.5512455E−05 |
| RA6 | −2.2619776E−06 |
| RA7 | −1.0179475E−06 |
| RA8 | −2.3654085E−07 |
| RA9 | −1.9141701E−09 |
| RA10 | 2.1744553E−08 |

| Asphe. Coeff. | S14 |
|---|---|
| KA | 1.1134285 |
| RA3 | −2.7685411E−03 |
| RA4 | 1.0806443E−04 |
| RA5 | 9.3411521E−06 |
| RA6 | −1.4593893E−06 |
| RA7 | −9.9908776E−07 |
| RA8 | −3.2655453E−07 |
| RA9 | −4.3774085E−08 |
| RA10 | 2.7628432E−08 |

| Asphe. Coeff. | S16 |
|---|---|
| KA | 1.0851113 |
| RA3 | −2.5129274E−04 |
| RA4 | 1.5787769E−05 |
| RA5 | 1.7228167E−05 |
| RA6 | −2.6507071E−06 |
| RA7 | −6.9638706E−07 |
| RA8 | 1.5772678E−08 |
| RA9 | 2.4457934E−08 |
| RA10 | −2.4367567E−09 |

| Asphe. Coeff. | S17 |
|---|---|
| KA | 1.0317813 |
| RA3 | −3.4678133E−04 |
| RA4 | 2.0799350E−04 |
| RA5 | −2.0626917E−06 |
| RA6 | −1.7027907E−06 |
| RA7 | −5.2190254E−07 |
| RA8 | −5.6788608E−08 |
| RA9 | 3.4739103E−08 |
| RA10 | −2.8254207E−09 |

(c) Example 2 Zoom Data

| Item | W.A. End | T.P. End |
|---|---|---|
| f | 4.76 | 97.62 |
| Fno. | 1.67 | 3.20 |
| 2ω | 65.6 | 3.5 |
| D7 | 0.85 | 26.36 |
| D14 | 26.89 | 1.38 |
| D19 | 7.04 | 13.72 |
| D25 | 9.72 | 3.04 |

*Aspheric Surface

TABLE 3

(a) Example 3 Basic Lens Data

| Si Surf. No. | Ri R. of Cur. | Di Surf. Dis. | Ndi Ref. index | νdi Abbe No. |
|---|---|---|---|---|
| 1 | 55.7258 | 1.30 | 1.84666 | 23.8 |
| 2 | 31.4680 | 5.51 | 1.49700 | 81.5 |
| 3 | 180.7851 | 0.10 | | |
| 4 | 38.3981 | 3.85 | 1.49700 | 81.5 |
| 5 | 214.4163 | 0.10 | | |
| 6 | 28.1850 | 3.65 | 1.72916 | 54.7 |
| 7 | 69.4144 | D7 | | |
| 8 | 58.5203 | 0.60 | 1.88300 | 40.8 |
| 9 | 5.7994 | 2.99 | | |
| 10 | −80.4441 | 0.61 | 1.90366 | 31.3 |
| 11 | 8.1410 | 3.05 | 1.92286 | 18.9 |
| 12 | ∞ | 0.10 | | |
| *13 | 31.6059 | 1.10 | 1.53389 | 56.0 |
| *14 | 30.7974 | D14 | | |
| 15 | ∞(aper. stop) | 1.40 | | |
| *16 | 9.3502 | 3.05 | 1.80348 | 40.5 |
| *17 | 30.7059 | 0.79 | | |
| 18 | 10.3796 | 0.60 | 1.94595 | 18.0 |
| 19 | 7.0036 | D19 | | |
| 20 | 18.0710 | 2.52 | 1.48749 | 70.2 |
| 21 | −18.0710 | 0.65 | | |
| 22 | −9.9016 | 0.55 | 1.92286 | 20.9 |
| 23 | −14.6719 | 0.10 | | |
| 24 | ∞ | 1.89 | 1.62041 | 60.3 |
| 25 | −15.0932 | D25 | | |
| 26 | ∞ | 1.70 | 1.51680 | 64.2 |
| 27 | ∞ | 1.95 | | |

(b) Example 3 Aspheric Data

| Asphe. Coeff. | S13 |
|---|---|
| KA | 2.7419007 |
| RA3 | −5.2359383E−03 |
| RA4 | 1.4971721E−03 |
| RA5 | 4.6523123E−05 |
| RA6 | −1.0000266E−04 |
| RA7 | 1.3677271E−05 |
| RA8 | 2.0091869E−06 |
| RA9 | −8.8109492E−07 |
| RA10 | 9.1289923E−08 |

| Asphe. Coeff. | S14 |
|---|---|
| KA | 1.4330560 |
| RA3 | −5.4234803E−03 |
| RA4 | 1.7173315E−03 |
| RA5 | −3.7957956E−04 |
| RA6 | 5.7133890E−05 |
| RA7 | −5.9353837E−06 |
| RA8 | −1.5544458E−06 |
| RA9 | 3.3928620E−07 |
| RA10 | −4.3765378E−09 |

| Asphe. Coeff. | S16 |
|---|---|
| KA | 0.8886009 |
| RA3 | 2.2615668E−04 |
| RA4 | −4.1248257E−05 |
| RA5 | 8.7632146E−07 |
| RA6 | 1.6831010E−06 |
| RA7 | −2.5972466E−07 |
| RA8 | −7.5128394E−08 |
| RA9 | 2.8500357E−08 |
| RA10 | −2.4785133E−09 |

| Asphe. Coeff. | S17 |
|---|---|
| KA | 1.0062459 |
| RA3 | 3.3012895E−04 |
| RA4 | 4.9825118E−05 |
| RA5 | 4.7147813E−06 |
| RA6 | −3.3425450E−06 |
| RA7 | 7.9222740E−07 |
| RA8 | −6.0378299E−09 |
| RA9 | −7.8511023E−09 |
| RA10 | −1.4425070E−10 |

TABLE 3-continued (c)
Example 3 Zoom Data

| Item | W.A. End | T.P. End |
|---|---|---|
| f | 4.82 | 102.54 |
| Fno. | 1.67 | 3.28 |
| 2ω | 62.3 | 3.2 |
| D7 | 0.65 | 24.00 |
| D14 | 24.85 | 1.50 |
| D19 | 8.06 | 14.78 |
| D25 | 10.07 | 3.36 |

*Aspheric Surface

TABLE 4

(a)
Example 4 Basic Lens Data

| Si Surf. No. | Ri R. of Cur. | Di Surf. Dis. | Ndi Ref. index | vdi Abbe No. |
|---|---|---|---|---|
| 1 | 58.0786 | 1.30 | 1.84666 | 23.8 |
| 2 | 30.2459 | 5.36 | 1.60311 | 60.6 |
| 3 | 119.8923 | 0.10 | | |
| 4 | 47.9775 | 3.75 | 1.49700 | 81.5 |
| 5 | 322.9280 | 0.10 | | |
| 6 | 26.8566 | 3.45 | 1.71300 | 53.9 |
| 7 | 68.4063 | D7 | | |
| 8 | 48.7068 | 0.60 | 1.78590 | 44.2 |
| 9 | 5.5529 | 3.20 | | |
| 10 | −35.1065 | 0.61 | 1.90366 | 31.3 |
| 11 | 8.2605 | 2.80 | 1.92286 | 18.9 |
| 12 | 108.0292 | 0.10 | | |
| *13 | 17.5000 | 0.90 | 1.50957 | 56.4 |
| *14 | 33.2730 | D14 | | |
| 15 | ∞(aper. stop) | 1.40 | | |
| 16 | 9.8318 | 3.10 | 1.80348 | 40.5 |
| *17 | 45.4534 | 0.10 | | |
| 18 | 10.2000 | 0.60 | 1.94595 | 18.0 |
| 19 | 7.1500 | D19 | | |
| 20 | 20.3124 | 2.55 | 1.48749 | 70.2 |
| 21 | −15.4923 | 0.40 | | |
| 22 | −10.5957 | 0.55 | 1.92286 | 20.9 |
| 23 | −15.3145 | 0.10 | | |
| 24 | −76.7516 | 1.80 | 1.60311 | 60.6 |
| 25 | −16.5776 | D25 | | |
| 26 | ∞ | 1.61 | 1.51680 | 64.2 |
| 27 | ∞ | 1.36 | | |
| 28 | ∞ | 0.32 | 1.51680 | 64.2 |
| 29 | ∞ | 0.75 | | |

(b)
Example 4 Aspheric Data

| Asphe. Coeff. | S13 |
|---|---|
| KA | 1.2743806 |
| RA3 | −4.4459235E−03 |
| RA4 | 6.4719476E−04 |
| RA5 | 3.4892998E−05 |
| RA6 | −3.4316256E−07 |
| RA7 | −1.5251442E−06 |
| RA8 | −5.3299977E−07 |
| RA9 | −6.3261941E−08 |
| RA10 | 2.2036927E−08 |

| Asphe. Coeff. | S14 |
|---|---|
| KA | 1.1775194 |
| RA3 | −4.3168006E−03 |
| RA4 | 3.5886803E−04 |
| RA5 | 4.4270413E−05 |
| RA6 | −1.1801232E−06 |
| RA7 | −1.6299147E−06 |
| RA8 | −5.1630544E−07 |
| RA9 | −8.0400932E−08 |
| RA10 | 2.1946874E−08 |

| Asphe. Coeff. | S17 |
|---|---|
| KA | 1.0047553 |
| RA3 | 1.5026084E−05 |
| RA4 | 1.3729552E−04 |
| RA5 | −6.9058263E−06 |
| RA6 | 9.9374046E−07 |
| RA7 | −5.5646349E−08 |
| RA8 | −3.1006180E−09 |
| RA9 | 9.8525496E−10 |
| RA10 | −9.6613384E−11 |

(c)
Example 4 Zoom Data

| Item | W.A. End | T.P. End |
|---|---|---|
| f | 4.89 | 105.19 |
| Fno. | 1.67 | 3.49 |
| 2ω | 63.8 | 3.2 |
| D7 | 0.85 | 25.14 |
| D14 | 25.58 | 1.30 |
| D19 | 8.44 | 15.40 |
| D25 | 9.43 | 2.47 |

*Aspheric Surface

TABLE 5

(a)
Example 5 Basic Lens Data

| Si Surf. No. | Ri R. of Cur. | Di Surf. Dis. | Ndi Ref. index | vdi Abbe No. |
|---|---|---|---|---|
| 1 | 64.0157 | 1.30 | 1.80518 | 25.4 |
| 2 | 28.7356 | 5.41 | 1.60311 | 60.6 |
| 3 | 116.6528 | 0.10 | | |
| 4 | 39.4451 | 3.75 | 1.49700 | 81.5 |
| 5 | 231.3814 | 0.10 | | |
| 6 | 28.4316 | 3.60 | 1.77250 | 49.6 |
| 7 | 65.0678 | D7 | | |
| 8 | 40.7146 | 0.60 | 1.83400 | 37.2 |
| 9 | 5.4691 | 3.10 | | |
| 10 | −37.6250 | 0.61 | 1.92000 | 30.5 |
| 11 | 8.2605 | 2.80 | 1.92286 | 18.9 |
| 12 | −135.4964 | 0.10 | | |
| *13 | 28.5749 | 0.90 | 1.50957 | 56.4 |
| *14 | 39.1690 | D14 | | |
| 15 | ∞(aper. stop) | 1.40 | | |
| 16 | 10.4585 | 3.20 | 1.86400 | 40.6 |
| *17 | 47.1692 | 0.25 | | |
| 18 | 10.2000 | 0.60 | 1.94595 | 18.0 |
| 19 | 7.1500 | D19 | | |
| 20 | 19.9050 | 2.75 | 1.48749 | 70.2 |
| 21 | −15.0801 | 0.60 | | |
| 22 | −11.0000 | 0.55 | 1.92286 | 20.9 |
| 23 | −18.0786 | 0.10 | | |
| 24 | −114.5816 | 1.80 | 1.60311 | 60.6 |
| 25 | −15.5281 | D25 | | |
| 26 | ∞ | 1.61 | 1.51680 | 64.2 |
| 27 | ∞ | 0.36 | | |
| 28 | ∞ | 0.32 | 1.51680 | 64.2 |
| 29 | ∞ | 0.55 | | |

(b)
Example 1 Aspheric Data

| Asphe. Coeff. | S13 |
|---|---|
| KA | 1.2625170 |
| RA3 | −4.8378036E−03 |
| RA4 | 6.5596494E−04 |
| RA5 | 3.5867420E−05 |

TABLE 5-continued

| | |
|---|---|
| RA6 | −6.3866582E−07 |
| RA7 | −1.5635587E−06 |
| RA8 | −5.2035323E−07 |
| RA9 | −5.7309129E−08 |
| RA10 | 2.3057055E−08 |

| Asphe. Coeff. | S14 |
|---|---|
| KA | 1.1690145 |
| RA3 | −4.6529731E−03 |
| RA4 | 2.8959743E−04 |
| RA5 | 3.9520978E−05 |
| RA6 | −8.4174638E−07 |
| RA7 | −1.5068270E−06 |
| RA8 | −5.0298014E−07 |
| RA9 | −8.0637828E−08 |
| RA10 | 2.1977338E−08 |

| Asphe. Coeff. | S17 |
|---|---|
| KA | 1.0049383 |
| RA3 | −2.4998161E−05 |
| RA4 | 1.3962200E−04 |
| RA5 | −6.9975327E−06 |
| RA6 | 3.2533518E−07 |
| RA7 | −1.7502351E−07 |
| RA8 | 4.6016663E−09 |
| RA9 | 1.1560018E−08 |
| RA10 | −1.2961096E−09 |

(c)
Example 5 Zoom Data

| Item | W.A. End | T.P. End |
|---|---|---|
| f | 4.88 | 119.58 |
| Fno. | 1.67 | 3.98 |
| 2ω | 62.1 | 2.8 |
| D7 | 0.85 | 25.44 |
| D14 | 25.89 | 1.30 |
| D19 | 8.06 | 17.45 |
| D25 | 9.96 | 0.57 |

*Aspheric Surface

TABLE 6

(a)
Example 6 Basic Lens Data

| Si Surf. No. | Ri R. of Cur. | Di Surf. Dis. | Ndi Ref index | νdi Abbe No. |
|---|---|---|---|---|
| 1 | 43.7973 | 1.40 | 1.92286 | 18.9 |
| 2 | 27.9104 | 6.01 | 1.49700 | 81.5 |
| 3 | 185.1326 | 0.10 | | |
| 4 | 31.7767 | 3.65 | 1.71300 | 53.9 |
| 5 | 82.3261 | 0.10 | | |
| 6 | 33.1380 | 3.00 | 1.79952 | 42.2 |
| 7 | 66.6688 | D7 | | |
| 8 | 65.2429 | 0.70 | 1.90366 | 31.3 |
| 9 | 6.2538 | 3.40 | | |
| 10 | −31.9124 | 0.69 | 1.88300 | 40.8 |
| 11 | 9.4922 | 3.70 | 1.92286 | 18.9 |
| 12 | −45.4778 | 0.30 | | |
| *13 | 32.4273 | 0.90 | 1.56865 | 58.6 |
| *14 | 14.8889 | D14 | | |
| 15 | ∞(aper. stop) | 1.00 | | |
| *16 | 8.6327 | 3.60 | 1.80348 | 40.5 |
| *17 | −292.7038 | 0.10 | | |
| 18 | 45.3427 | 0.64 | 1.83400 | 37.3 |
| 19 | 7.6903 | D19 | | |
| 20 | 13.6961 | 4.00 | 1.49700 | 81.5 |
| 21 | −13.6403 | 0.40 | | |
| 22 | −12.1875 | 0.73 | 1.92286 | 18.9 |
| 23 | −57.6674 | 0.10 | | |
| 24 | 157.4965 | 2.60 | 1.83481 | 42.7 |
| 25 | −19.4587 | 0.10 | | |
| *26 | 65.3361 | 1.50 | 1.50957 | 56.4 |
| *27 | −56.1034 | D27 | | |
| 28 | ∞ | 1.61 | 1.51680 | 64.2 |
| 29 | ∞ | 1.36 | | |
| 30 | ∞ | 0.32 | 1.51680 | 64.2 |
| 31 | ∞ | 1.26 | | |

(b)
Example 6 Aspheric Data

| Asphe. Coeff. | S13 |
|---|---|
| KA | 1.0296041 |
| RA3 | −4.4770881E−03 |
| RA4 | 4.1896391E−05 |
| RA5 | 2.6392101E−05 |
| RA6 | 3.9707003E−06 |
| RA7 | −1.0550434E−07 |
| RA8 | −1.9904776E−07 |
| RA9 | −2.8799774E−08 |
| RA10 | 6.5044296E−09 |

| Asphe. Coeff. | S14 |
|---|---|
| KA | 0.9927825 |
| RA3 | −4.8457145E−03 |
| RA4 | 3.5878877E−05 |
| RA5 | 1.4187558E−06 |
| RA6 | −6.9808134E−07 |
| RA7 | 5.4783897E−08 |
| RA8 | −1.5365775E−08 |
| RA9 | −2.4574665E−08 |
| RA10 | 2.6124469E−09 |

| Asphe. Coeff. | S16 |
|---|---|
| KA | 0.7291231 |
| RA3 | 2.1082226E−04 |
| RA4 | −7.7901859E−05 |
| RA5 | −1.6982741E−06 |
| RA6 | 2.3020999E−06 |
| RA7 | 7.6338633E−08 |
| RA8 | −5.8937336E−08 |
| RA9 | −1.1121252E−08 |
| RA10 | 1.7767059E−09 |

| Asphe. Coeff. | S17 |
|---|---|
| KA | 1.0222643 |
| RA3 | 6.6863847E−04 |
| RA4 | −1.3944848E−04 |
| RA5 | 1.8358496E−05 |
| RA6 | 2.9022377E−06 |
| RA7 | −8.1237667E−08 |
| RA8 | −1.1071405E−07 |
| RA9 | −1.3910687E−08 |
| RA10 | 3.2297493E−09 |

| Asphe. Coeff. | S26 |
|---|---|
| KA | 0.9970653 |
| RA3 | −6.3083461E−05 |
| RA4 | −1.9952860E−04 |
| RA5 | −1.0490868E−05 |
| RA6 | 9.2735485E−08 |
| RA7 | −2.5789168E−07 |
| RA8 | −1.2703565E−07 |
| RA9 | −2.2190920E−08 |
| RA10 | 5.2989623E−09 |

| Asphe. Coeff. | S27 |
|---|---|
| KA | 0.9991596 |
| RA3 | −5.4110995E−04 |
| RA4 | 2.9639209E−05 |
| RA5 | −1.4955662E−05 |
| RA6 | −3.8451971E−06 |
| RA7 | −5.1700888E−07 |
| RA8 | −1.8886983E−08 |

TABLE 6-continued

| | |
|---|---|
| RA9 | 3.0383883E-09 |
| RA10 | 1.5793514E-09 |

(c)
Example 6 Zoom Data

| Item | W.A. End | T.P. End |
|---|---|---|
| f | 4.71 | 96.57 |
| Fno. | 1.66 | 3.13 |
| 2ω | 66.0 | 3.5 |
| D7 | 0.85 | 21.68 |
| D14 | 21.93 | 1.10 |
| D19 | 6.99 | 13.08 |
| D27 | 8.61 | 2.52 |

*Aspheric Surface

TABLE 7

(a)
Example 7 Basic Lens Data

| Si Surf. No. | Ri R. of Cur. | Di Surf. Dis. | Ndi Ref. index | νdi Abbe No. |
|---|---|---|---|---|
| 1 | 49.0811 | 1.30 | 1.94595 | 18.0 |
| 2 | 32.6747 | 5.56 | 1.43875 | 94.9 |
| 3 | 157.8222 | 0.10 | | |
| 4 | 42.8997 | 4.00 | 1.49700 | 81.5 |
| 5 | 313.5051 | 0.10 | | |
| 6 | 27.6702 | 3.35 | 1.78590 | 44.2 |
| 7 | 65.7808 | D7 | | |
| 8 | 46.2078 | 0.60 | 1.88300 | 40.8 |
| 9 | 5.7344 | 3.10 | | |
| 10 | −63.4785 | 0.61 | 1.90366 | 31.3 |
| 11 | 7.5057 | 3.05 | 1.92286 | 18.9 |
| 12 | ∞ | 0.10 | | |
| *13 | 35.0000 | 1.10 | 1.53389 | 56.0 |
| *14 | 43.7705 | D14 | | |
| 15 | ∞(aper. stop) | 1.40 | | |
| *16 | 9.7450 | 3.00 | 1.80348 | 40.5 |
| *17 | 23.6658 | 0.94 | | |
| 18 | 9.1103 | 0.60 | 1.94595 | 18.0 |
| 19 | 6.8045 | D19 | | |
| 20 | 19.6784 | 2.40 | 1.48749 | 70.2 |
| 21 | −18.0432 | 0.68 | | |
| 22 | −9.6248 | 0.55 | 1.92286 | 18.9 |
| 23 | −13.8922 | 0.10 | | |
| 24 | 237.2688 | 1.80 | 1.62299 | 58.2 |
| 25 | −15.0336 | D25 | | |
| 26 | ∞ | 1.70 | 1.51680 | 64.2 |
| 27 | ∞ | 2.19 | | |

(b)
Example 7 Aspheric Data

| Asphe. Coeff. | S13 |
|---|---|
| KA | 1.2658882 |
| RA3 | −5.5546402E-03 |
| RA4 | 1.8502234E-02 |
| RA5 | −8.3806206E-02 |
| RA6 | 2.2883937E-01 |
| RA7 | −4.0828551E-01 |
| RA8 | 5.0957717E-01 |
| RA9 | −4.6399400E-01 |
| RA10 | 3.1667363E-01 |
| RA11 | −1.6480690E-01 |
| RA12 | 6.6048569E-02 |
| RA13 | −2.0454941E-02 |
| RA14 | 4.8821794E-03 |
| RA15 | −8.8938937E-04 |
| RA16 | 1.2134201E-04 |
| RA17 | −1.1997289E-05 |
| RA18 | 8.1144363E-07 |

TABLE 7-continued

| | |
|---|---|
| RA19 | −3.3572686E-08 |
| RA20 | 6.4064200E-10 |

| Asphe. Coeff. | S14 |
|---|---|
| KA | 1.1819002 |
| RA3 | −3.8851571E-03 |
| RA4 | 4.8333654E-04 |
| RA5 | 2.5146645E-05 |
| RA6 | −7.7664992E-06 |
| RA7 | −2.0432233E-06 |
| RA8 | −3.4832048E-07 |
| RA9 | −2.5233303E-08 |
| RA10 | 2.4372757E-08 |

| Asphe. Coeff. | S16 |
|---|---|
| KA | 0.872548 |
| RA3 | 1.4683069E-04 |
| RA4 | −1.3159263E-05 |
| RA5 | 3.1079403E-06 |
| RA6 | −1.0540577E-06 |
| RA7 | −2.3350201E-07 |
| RA8 | −4.0873342E-08 |
| RA9 | 1.2922684E-08 |
| RA10 | −2.1578031E-09 |

| Asphe. Coeff. | S17 |
|---|---|
| KA | 1.008673 |
| RA3 | 2.1109409E-04 |
| RA4 | 7.4795410E-05 |
| RA5 | −4.0702239E-06 |
| RA6 | −3.3824079E-06 |
| RA7 | 4.2237061E-07 |
| RA8 | −9.4170905E-08 |
| RA9 | −2.1497709E-08 |
| RA10 | 2.5458077E-09 |

(c)
Example 7 Zoom Data

| Item | W.A. End | T.P. End |
|---|---|---|
| f | 4.79 | 101.73 |
| Fno. | 1.67 | 3.38 |
| 2ω | 64.5 | 3.3 |
| D7 | 0.65 | 24.06 |
| D14 | 24.91 | 1.49 |
| D19 | 7.41 | 14.70 |
| D25 | 10.42 | 3.13 |

*Aspheric Surface

TABLE 8

(a)
Example 8 Basic Lens Data

| Si Surf. No. | Ri R. of Cur. | Di Surf. Dis. | Ndi Ref. index | νdi Abbe No. |
|---|---|---|---|---|
| 1 | 52.4897 | 1.40 | 1.92286 | 20.9 |
| 2 | 32.5480 | 5.01 | 1.49700 | 81.5 |
| 3 | 135.7237 | 0.10 | | |
| 4 | 39.3757 | 3.50 | 1.62299 | 58.2 |
| 5 | 125.4396 | 0.10 | | |
| 6 | 28.7292 | 3.30 | 1.71300 | 53.9 |
| 7 | 68.1394 | D7 | | |
| 8 | 55.0733 | 0.70 | 1.90366 | 31.3 |
| 9 | 5.6493 | 3.25 | | |
| 10 | −22.6969 | 0.71 | 1.88300 | 40.8 |
| 11 | 12.4053 | 2.80 | 1.92286 | 18.9 |
| 12 | −29.7524 | 0.10 | | |

TABLE 8-continued

| | | | | |
|---|---|---|---|---|
| *13 | 25.0000 | 0.90 | 1.50957 | 56.4 |
| *14 | 20.0000 | D14 | | |
| 15 | ∞(aper. stop) | 1.40 | | |
| 16 | 10.1643 | 3.20 | 1.80348 | 40.5 |
| *17 | 63.9323 | 0.10 | | |
| 18 | 10.2000 | 0.64 | 1.94595 | 18.0 |
| 19 | 7.1500 | D19 | | |
| 20 | 20.0335 | 3.20 | 1.48749 | 70.2 |
| 21 | −10.4871 | 0.20 | | |
| 22 | −9.3690 | 0.68 | 1.84666 | 23.8 |
| 23 | −23.4490 | 0.16 | | |
| 24 | −68.8004 | 1.95 | 1.71300 | 53.9 |
| 25 | −14.3006 | D25 | | |
| 26 | ∞ | 1.61 | 1.51680 | 64.2 |
| 27 | ∞ | 1.36 | | |
| 28 | ∞ | 0.32 | 1.51680 | 64.2 |
| 29 | ∞ | 1.83 | | |

(b)
Example 8 Aspheric Data

| Asphe. Coeff. | S13 |
|---|---|
| KA | 1.195274 |
| RA3 | −2.8762923E−03 |
| RA4 | 3.7600439E−04 |
| RA5 | 3.1505834E−05 |
| RA6 | 2.0429052E−07 |
| RA7 | −1.0795740E−06 |
| RA8 | −3.3276843E−07 |
| RA9 | −1.6978683E−08 |
| RA10 | 2.4854246E−08 |

| Asphe. Coeff. | S14 |
|---|---|
| KA | 1.161580 |
| RA3 | −3.0498151E−03 |
| RA4 | 2.0345542E−04 |
| RA5 | 1.4388915E−05 |
| RA6 | −2.4200859E−06 |
| RA7 | −1.0467859E−06 |
| RA8 | −2.6276862E−07 |
| RA9 | −2.9600901E−08 |
| RA10 | 2.4600012E−08 |

| Asphe. Coeff. | S17 |
|---|---|
| KA | 1.024165 |
| RA3 | 1.3934992E−04 |
| RA4 | 3.2634233E−05 |
| RA5 | 1.8815609E−05 |
| RA6 | 4.0928146E−07 |
| RA7 | −5.6630787E−07 |
| RA8 | −5.8924489E−08 |
| RA9 | 3.3392260E−08 |
| RA10 | −2.7671859E−09 |

(c)
Example 8 Zoom Data

| Item | W.A. End | T.P. End |
|---|---|---|
| f | 4.70 | 79.93 |
| Fno. | 1.70 | 2.66 |
| 2ω | 66.9 | 4.3 |
| D7 | 0.85 | 25.18 |
| D14 | 25.69 | 1.36 |
| D19 | 8.23 | 10.56 |
| D25 | 7.74 | 5.42 |

*Aspheric Surface

TABLE 9

(a)
Example 9 Basic Lens Data

| Si Surf. No. | Ri R. of Cur. | Di Surf. Dis. | Ndi Ref. index | vdi Abbe No. |
|---|---|---|---|---|
| 1 | 46.7867 | 1.40 | 1.92286 | 20.9 |
| 2 | 29.4670 | 5.81 | 1.49700 | 81.5 |
| 3 | 129.8106 | 0.10 | | |
| 4 | 34.9285 | 3.65 | 1.71300 | 53.9 |
| 5 | 98.1500 | 0.10 | | |
| 6 | 29.5623 | 3.20 | 1.71300 | 53.9 |
| 7 | 65.3686 | D7 | | |
| 8 | 63.0691 | 0.70 | 1.90366 | 31.3 |
| 9 | 5.3090 | 3.50 | | |
| 10 | −23.3657 | 0.69 | 1.88300 | 40.8 |
| 11 | 17.0091 | 2.70 | 1.92286 | 18.9 |
| 12 | −19.9463 | 0.30 | | |
| *13 | 28.2842 | 0.90 | 1.56865 | 58.6 |
| *14 | 12.3094 | D14 | | |
| 15 | ∞(aper. stop) | 1.00 | | |
| *16 | 10.6177 | 3.50 | 1.80348 | 40.5 |
| *17 | 428.2183 | 0.10 | | |
| 18 | 10.6114 | 0.64 | 1.92286 | 20.9 |
| 19 | 7.2554 | D19 | | |
| 20 | 17.7870 | 3.20 | 1.49700 | 81.5 |
| 21 | −13.8569 | 0.40 | | |
| 22 | −12.1875 | 0.73 | 1.92286 | 18.9 |
| 23 | −33.7746 | 2.26 | 1.61800 | 63.3 |
| 24 | −16.2957 | 0.10 | | |
| *25 | 66.6844 | 2.00 | 1.83481 | 42.7 |
| *26 | −153.3270 | D26 | | |
| 27 | ∞ | 1.61 | 1.51680 | 64.2 |
| 28 | ∞ | 1.36 | | |
| 29 | ∞ | 0.32 | 1.51680 | 64.2 |
| 30 | ∞ | 1.75 | | |

(b)
Example 9 Aspheric Data

| Asphe. Coeff. | S13 |
|---|---|
| KA | 1.0560328 |
| RA3 | −4.1149921E−03 |
| RA4 | 1.8364647E−04 |
| RA5 | 3.3503119E−05 |
| RA6 | 4.4975056E−06 |
| RA7 | 1.2544831E−07 |
| RA8 | −1.0879249E−07 |
| RA9 | −8.3879590E−10 |
| RA10 | 1.4268776E−08 |

| Asphe. Coeff. | S14 |
|---|---|
| KA | 0.960652 |
| RA3 | −4.5513577E−03 |
| RA4 | 2.3781035E−05 |
| RA5 | 3.8009681E−06 |
| RA6 | −3.6405227E−07 |
| RA7 | 9.7489572E−08 |
| RA8 | 1.7253586E−08 |
| RA9 | −4.3923973E−09 |
| RA10 | 1.1433957E−08 |

| Asphe. Coeff. | S16 |
|---|---|
| KA | 0.776502 |
| RA3 | 3.7916850E−04 |
| RA4 | −8.5206069E−05 |
| RA5 | 9.1300765E−08 |
| RA6 | 2.3018321E−06 |
| RA7 | 7.1102863E−08 |
| RA8 | −4.2348690E−08 |
| RA9 | −7.1522756E−09 |
| RA10 | 1.2391463E−09 |

TABLE 9-continued

| Asphe. Coeff. | S17 |
|---|---|
| KA | 1.022419 |
| RA3 | 6.2635247E−04 |
| RA4 | −9.9135204E−05 |
| RA5 | 1.5749726E−05 |
| RA6 | 2.1862782E−06 |
| RA7 | −9.3532266E−08 |
| RA8 | −6.9161162E−08 |
| RA9 | −6.0886899E−10 |
| RA10 | 1.0226063E−09 |

(c)
Example 9 Zoom Data

| Item | W.A. End | T.P. End |
|---|---|---|
| f | 4.70 | 96.41 |
| Fno. | 1.68 | 3.15 |
| 2ω | 66.6 | 3.5 |
| D7 | 0.85 | 23.40 |
| D14 | 23.65 | 1.10 |
| D19 | 9.00 | 12.54 |
| D26 | 6.01 | 2.46 |

*Aspheric Surface

TABLE 10

(a)
Example 10 Basic Lens Data

| Si Surf. No. | Ri R. of Cur. | Di Surf. Dis. | Ndi Ref. index | νdi Abbe No. |
|---|---|---|---|---|
| 1 | 46.6251 | 1.40 | 1.92286 | 20.9 |
| 2 | 29.5216 | 5.01 | 1.49700 | 81.5 |
| 3 | 89.5699 | 0.10 | | |
| 4 | 38.3596 | 3.50 | 1.71300 | 53.9 |
| 5 | 119.2326 | 0.10 | | |
| 6 | 31.0000 | 3.40 | 1.71300 | 53.9 |
| 7 | 71.9969 | D7 | | |
| 8 | 65.8075 | 0.70 | 1.88300 | 40.8 |
| 9 | 5.7106 | 3.30 | | |
| 10 | −30.1825 | 0.71 | 1.90366 | 31.3 |
| 11 | 13.2390 | 2.80 | 1.92286 | 18.9 |
| 12 | −30.5807 | 0.10 | | |
| *13 | 24.4242 | 0.90 | 1.56865 | 58.6 |
| *14 | 16.0000 | D14 | | |
| 15 | ∞(aper. stop) | 1.40 | | |
| *16 | 10.5349 | 3.50 | 1.80348 | 40.5 |
| *17 | 131.0664 | 0.22 | | |
| 18 | 10.3165 | 0.64 | 1.94595 | 18.0 |
| 19 | 7.1991 | D19 | | |
| 20 | 20.1979 | 3.21 | 1.62299 | 58.2 |
| 21 | −11.4870 | 0.68 | 1.84666 | 23.8 |
| 22 | −48.3822 | 0.10 | | |
| 23 | 145.3310 | 1.95 | 1.48749 | 70.2 |
| 24 | −22.6970 | D24 | | |
| 25 | ∞ | 1.61 | 1.51680 | 64.2 |
| 26 | ∞ | 1.36 | | |
| 27 | ∞ | 0.32 | 1.51680 | 64.2 |
| 28 | ∞ | 1.31 | | |

(b)
Example 10 Aspheric Data

| Asphe. Coeff. | S13 |
|---|---|
| KA | 1.1834651 |
| RA3 | −3.4142158E−03 |
| RA4 | 3.3718902E−04 |
| RA5 | 3.0667916E−05 |
| RA6 | 9.7852239E−07 |
| RA7 | −7.9667976E−07 |
| RA8 | −2.8032428E−07 |
| RA9 | −1.6873438E−08 |
| RA10 | 2.0276777E−08 |

| Asphe. Coeff. | S14 |
|---|---|
| KA | 1.146845 |
| RA3 | −3.6713606E−03 |
| RA4 | 1.6094110E−04 |
| RA5 | 1.6468667E−05 |
| RA6 | −1.5113898E−06 |
| RA7 | −8.7330474E−07 |
| RA8 | −2.3811082E−07 |
| RA9 | −3.1285245E−08 |
| RA10 | 2.1279064E−08 |

| Asphe. Coeff. | S16 |
|---|---|
| KA | 0.530357 |
| RA3 | 5.4657810E−04 |
| RA4 | −1.1938905E−04 |
| RA5 | 6.7505799E−06 |
| RA6 | 3.1933226E−06 |
| RA7 | 3.1570612E−08 |
| RA8 | −5.4043454E−08 |
| RA9 | −1.2311295E−08 |
| RA10 | 2.3165814E−09 |

| Asphe. Coeff. | S17 |
|---|---|
| KA | 1.022169 |
| RA3 | 8.4494605E−04 |
| RA4 | −1.9250890E−04 |
| RA5 | 2.5423008E−05 |
| RA6 | 4.2138600E−06 |
| RA7 | −2.4208687E−07 |
| RA8 | −1.5134457E−07 |
| RA9 | 6.7220583E−09 |
| RA10 | 1.7744574E−09 |

(c)
Example 10 Zoom Data

| Item | W.A. End | T.P. End |
|---|---|---|
| f | 4.71 | 96.48 |
| Fno. | 1.69 | 3.20 |
| 2ω | 67.0 | 3.5 |
| D7 | 0.85 | 25.90 |
| D14 | 26.36 | 1.30 |
| D19 | 8.81 | 13.46 |
| D24 | 6.92 | 2.27 |

*Aspheric Surface

TABLE 11

(a)
Example 11 Basic Lens Data

| Si Surf. No. | Ri R. of Cur. | Di Surf. Dis. | Ndi Ref. index | νdi Abbe No. |
|---|---|---|---|---|
| 1 | 59.9932 | 1.40 | 1.84666 | 23.8 |
| 2 | 29.8701 | 5.41 | 1.49700 | 81.5 |
| 3 | 118.6221 | 0.10 | | |
| 4 | 47.2715 | 3.75 | 1.62299 | 58.2 |
| 5 | 343.5255 | 0.10 | | |
| 6 | 26.1218 | 3.30 | 1.72916 | 54.7 |
| 7 | 79.1617 | D7 | | |
| 8 | 78.9942 | 0.70 | 1.90366 | 31.3 |
| 9 | 5.8156 | 3.30 | | |
| 10 | −24.6951 | 0.71 | 1.88300 | 40.8 |
| 11 | 10.7517 | 2.80 | 1.92286 | 18.9 |

TABLE 11-continued

| | | | | |
|---|---|---|---|---|
| 12 | −38.5186 | 0.10 | | |
| *13 | 25.0000 | 0.90 | 1.50957 | 56.4 |
| *14 | 20.0000 | D14 | | |
| 15 | ∞(aper. stop) | 1.40 | | |
| 16 | 9.7443 | 3.20 | 1.80348 | 40.5 |
| *17 | 35.7520 | 0.65 | | |
| 18 | 10.2000 | 0.64 | 1.94595 | 18.0 |
| 19 | 7.1500 | D19 | | |
| 20 | 22.1260 | 3.00 | 1.48749 | 70.2 |
| 21 | −11.6853 | 0.35 | | |
| 22 | −9.2827 | 0.68 | 1.84666 | 23.8 |
| 23 | −24.0490 | 0.10 | | |
| 24 | 116.4334 | 1.95 | 1.71300 | 53.9 |
| 25 | −14.6797 | D25 | | |
| 26 | ∞ | 1.61 | 1.51680 | 64.2 |
| 27 | ∞ | 1.36 | | |
| 28 | ∞ | 0.32 | 1.51680 | 64.2 |
| 29 | ∞ | 0.88 | | |

(b)
Example 11 Aspheric Data

| Asphe. Coeff. | S13 |
|---|---|
| KA | 1.2020580 |
| RA3 | −2.8815869E−03 |
| RA4 | 3.9943435E−04 |
| RA5 | 3.2140571E−05 |
| RA6 | −2.6235335E−07 |
| RA7 | −1.2487338E−06 |

TABLE 11-continued

| | |
|---|---|
| RA8 | −2.9528632E−07 |
| RA9 | −3.8343963E−08 |
| RA10 | 2.2866928E−08 |

| Asphe. Coeff. | S17 |
|---|---|
| KA | 1.0256088 |
| RA3 | 1.1243008E−04 |
| RA4 | 5.7728930E−05 |
| RA5 | 1.3271375E−05 |
| RA6 | 4.6852087E−07 |
| RA7 | −3.8121064E−07 |
| RA8 | −5.8228923E−08 |
| RA9 | 2.8185823E−08 |
| RA10 | −2.3735806E−09 |

(c)
Example 11 Zoom Data

| Item | W.A. End | T.P. End |
|---|---|---|
| f | 4.50 | 99.02 |
| Fno. | 1.67 | 3.39 |
| 2ω | 72.0 | 3.6 |
| D7 | 0.85 | 24.11 |
| D14 | 24.56 | 1.30 |
| D19 | 7.80 | 13.93 |
| D25 | 9.36 | 3.23 |

*Aspheric Surface

TABLE 12

| Type of Conditional Expression | Formula in Conditional Expression | Value of Formula in Conditional Expression | | | | | | | | | | |
|---|---|---|---|---|---|---|---|---|---|---|---|---|
| | | Example 1 | Example 2 | Example 3 | Example 4 | Example 5 | Example 6 | Example 7 | Example 8 | Example 9 | Example 10 | Example 11 |
| (A) | TL/ft | 0.66 | 0.85 | 0.80 | 0.77 | 0.68 | 0.84 | 0.80 | 1.01 | 0.85 | 0.84 | 0.82 |
| (B) | vd21 | 40.8 | 31.3 | 40.8 | 44.2 | 37.2 | 31.3 | 40.8 | 31.3 | 31.3 | 40.8 | 31.3 |
| (C) | f3/fw | 6.33 | 6.09 | 6.10 | 5.28 | 5.28 | 7.79 | 6.85 | 5.18 | 4.57 | 4.79 | 5.96 |
| (D) | M2/ft | 0.20 | 0.26 | 0.23 | 0.23 | 0.21 | 0.22 | 0.23 | 0.30 | 0.23 | 0.26 | 0.23 |
| (E) | vd11 | 23.8 | 23.8 | 23.8 | 23.8 | 25.4 | 18.9 | 18.0 | 20.9 | 20.9 | 20.9 | 23.8 |
| (F) | |f24/f2| | 657.07 | 16.38 | 645.98 | 10.57 | 29.31 | 8.19 | 45.59 | 30.97 | 6.78 | 12.82 | 32.77 |
| (G) | Nd14 | 1.73 | 1.73 | 1.73 | 1.71 | 1.77 | 1.80 | 1.79 | 1.71 | 1.71 | 1.71 | 1.73 |
| (H) | vd14 | 54.7 | 54.7 | 54.7 | 53.9 | 49.6 | 42.2 | 44.2 | 53.9 | 53.9 | 53.9 | 54.7 |
| (I) | vd1m | 81.6 | 81.6 | 81.6 | 81.6 | 81.6 | 81.6 | 95.0 | 81.6 | 81.6 | 81.6 | 81.6 |
| (J) | f1/ft | 0.30 | 0.40 | 0.36 | 0.36 | 0.32 | 0.36 | 0.36 | 0.48 | 0.37 | 0.41 | 0.36 |
| (K) | Nd22 | 1.90 | 1.88 | 1.90 | 1.90 | 1.92 | 1.90 | 1.90 | 1.90 | 1.89 | 1.90 | 1.88 |
| (L) | |f2|/(fw · ft)|$^{1/2}$ | 0.27 | 0.34 | 0.30 | 0.30 | 0.28 | 0.29 | 0.31 | 0.35 | 0.27 | 0.31 | 0.30 |
| (M) | fw/IH | 1.54 | 1.59 | 1.61 | 1.63 | 1.68 | 1.57 | 1.59 | 1.57 | 1.57 | 1.57 | 1.43 |

*Values not satisfy conditional expressions are underlined.

TABLE 11-continued

| | |
|---|---|
| RA8 | −3.7202281E−07 |
| RA9 | −2.4727401E−08 |
| RA10 | 2.3853316E−08 |

| Asphe. Coeff. | S14 |
|---|---|
| KA | 1.1749354 |
| RA3 | −3.0483447E−03 |
| RA4 | 2.2579074E−04 |
| RA5 | 1.6640159E−05 |
| RA6 | −2.3618607E−06 |
| RA7 | −1.1193137E−06 |

What is claimed is:

1. A zoom lens, consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:
the first lens group is consisted of a first group first lens having a negative power, a first group second lens having a positive power, a first group third lens having a positive power, and a first group fourth lens having a positive power, disposed in this order from the object side;

the second lens group is consisted of a second group first lens having a negative power, a second group second lens having a negative power, a second group third lens having a positive power, and a second group fourth lens having a positive or negative power with at least one surface being aspheric, disposed in this order from the object side; and the zoom lens is configured to simultaneously satisfy conditional expressions (1) and (2) given blow:

$$0.62 < TL/ft < 0.88 \quad (1); \text{ and}$$

$$30 < vd21 < 48 \quad (2),$$

where:

ft is a focal length of the overall lens system at a telephoto end;

TL is a distance from an object side surface of the first group first lens to an image forming plane on the optical axis; and vd21 is an Abbe number of the second group first lens with respect to d-line, wherein the second group second lens and second group third lens are cemented and the second lens group satisfies a conditional expression given below:

$$1.89 < Nd22 \quad (18),$$

where:

Nd22 is a refractive index of the second group second lens.

2. The zoom lens of claim 1, wherein the zoom lens satisfies a conditional expression (8) given below:

$$17 < vd11 < 27 \quad (8),$$

where:

vd11 is an Abbe number of the first group first lens with respect to d-line.

3. The zoom lens of claim 1, wherein the zoom lens satisfies a conditional expression (10) given below:

$$0.17 < M2/ft < 0.32 \quad (10),$$

where:

M2 is an amount of movement of the second lens group at the time of zooming from the wide angle end to the telephoto end.

4. The zoom lens of claim 1, wherein the zoom lens satisfies a conditional expression (11) given below:

$$4.2 < f3/fw < 8.0 \quad (11),$$

where:

fw is a focal length of the overall lens system at the wide angle end; and f3 is a focal length of the third lens group.

5. The zoom lens of claim 1, wherein the third lens group consists of a third group first lens having a positive power with at least one surface being aspheric and a third group second lens having a negative power.

6. The zoom lens of claim 1, wherein an object side surface of the second group fourth lens is aspheric and an intersection between a vertical line drawn to the optical axis from an outermost edge of an effective area of the aspheric surface and the optical axis locates on the image plane side of an intersection between the aspheric surface and optical axis.

7. The zoom lens of claim 1, wherein the second group fourth lens is a plastic lens.

8. The zoom lens of claim 1, wherein the second group fourth lens satisfies a conditional expression (13) given below:

$$10.0 < |f24/f2| \quad (13),$$

where:

f24 is a focal length of the second group fourth lens; and f2 is a focal length of the second lens group.

9. The zoom lens of claim 1, wherein the first group fourth lens simultaneously satisfies conditional expressions (14) and (15) given below:

$$1.70 < Nd14 \quad (14); \text{ and}$$

$$42 < vd14 < 58 \quad (15),$$

where:

Nd14 is a refractive index of the first group fourth lens with respect to d-line; and vd14 is an Abbe number of the first group fourth lens with respect to d-line.

10. The zoom lens of claim 1, wherein the first lens group satisfies a conditional expression (16) given below:

$$75 < vd1m \quad (16),$$

where:

vd1m is an Abbe number of at least one positive lens in the first lens group with respect to d-line.

11. The zoom lens of claim 1, wherein the zoom lens satisfies a conditional expression (17) given below:

$$0.25 < f1/ft < 0.50 \quad (17),$$

where:

f1 is a focal length of the first lens group.

12. The zoom lens of claim 1, wherein the zoom lens satisfies a conditional expression (19) given below:

$$0.25 < |f2|/(fw \cdot ft)^{1/2} < 0.38 \quad (19),$$

where:

f2 is a focal length of the second lens group; and fw is a focal length of the overall lens system at the wide angle end.

13. The zoom lens of claim 1, wherein the zoom lens satisfies a conditional expression (20) given below:

$$1.30 < fw/IH < 1.75 \quad (20),$$

where:

fw is a focal length of the overall lens system at the wide angle end; and

IH is a maximum image height.

14. An image pickup apparatus, comprising the zoom lens of claim 1.

15. A zoom lens, consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the first lens group consists of a first group first lens having a negative power, a first group second lens having a positive power, a first group third lens having a positive power, and a first group fourth lens having a positive power, disposed in this order from the object side;

the second lens group comprises a second group first lens having a negative power, a second group second lens having a negative power, and a second group third lens having a positive power, disposed in this order from the object side;

the third lens group consists of a third group first lens having a positive power with at least one surface being aspheric and a third group second lens having a negative power; and the zoom lens is configured to simultaneously satisfy conditional expressions (3),(4), and (9) given blow:

$$0.62 < TL/ft < 0.88 \qquad (3);$$

$$4.2 < f3/fw < 8.0 \qquad (4); \text{ and}$$

$$30 < vdp21 < 48 \qquad (9),$$

where:
ft is a focal length of the overall lens system at a telephoto end;
TL is a distance from an object side surface of the first group first lens to an image forming plane on the optical axis;
f3 is a focal length of the third lens group;
fw is a focal length of the overall lens system at a wide angle end; and
vd21 is an Abbe number of the second group first lens with respect to d-line.

16. The zoom lens of claim 15, wherein the zoom lens satisfies a conditional expression (8) given below:

$$17 < vd11 < 27 \qquad (8),$$

where:
vd11 is an Abbe number of the first group first lens with respect to d-line.

17. The zoom lens of claim 15, wherein the zoom lens satisfies a conditional expression (10) given below:

$$0.17 < M2/ft < 0.32 \qquad (10),$$

where:
M2 is an amount of movement of the second lens group at the time of zooming from the wide angle end to the telephoto end.

18. The zoom lens of claim 15, wherein the second lens group comprises a second group fourth lens with at least one surface being aspheric disposed on the image plane side of the second group third lens.

19. An image pickup apparatus, comprising the zoom lens of claim 15.

* * * * *